(12) United States Patent
Al-Otaibi et al.

(10) Patent No.: US 8,290,807 B2
(45) Date of Patent: *Oct. 16, 2012

(54) SYSTEMS, PROGRAM PRODUCTS AND METHODS OF HUMAN RESOURCES PLANNING AND DEVELOPMENT

(75) Inventors: Hani A. Al-Otaibi, Dhahran (SA); Saad Younes Mousa, Damman (SA); Maan J. Khalife, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 116 days.

This patent is subject to a terminal disclaimer.

(21) Appl. No.: 12/649,563

(22) Filed: Dec. 30, 2009

(65) Prior Publication Data

US 2010/0106566 A1 Apr. 29, 2010

Related U.S. Application Data

(63) Continuation of application No. 11/334,213, filed on Jan. 18, 2006, now Pat. No. 7,672,861.

(60) Provisional application No. 60/645,822, filed on Jan. 21, 2005.

(51) Int. Cl.
*G06Q 10/00* (2012.01)

(52) U.S. Cl. ........................ 705/7.25; 705/320

(58) Field of Classification Search .............. 705/7.25, 705/320

See application file for complete search history.

(56) References Cited

U.S. PATENT DOCUMENTS

| | | | |
|---|---|---|---|
| 5,918,207 A | 6/1999 | McGovern | |
| 6,275,812 B1 * | 8/2001 | Haq et al. | 705/7.14 |
| 6,546,230 B1 * | 4/2003 | Allison | 434/350 |
| 6,944,624 B2 * | 9/2005 | Orton et al. | 1/1 |
| 7,299,067 B2 * | 11/2007 | Riggs | 455/556.2 |
| 7,367,808 B1 * | 5/2008 | Frank et al. | 434/219 |
| 2001/0039002 A1 | 11/2001 | Delehanty | |
| 2002/0077884 A1 | 6/2002 | Sketch | |
| 2002/0143599 A1 * | 10/2002 | Nourbakhsh et al. | 705/9 |
| 2002/0184069 A1 | 12/2002 | Kosiba | |
| 2003/0055937 A1 * | 3/2003 | Matsushima et al. | 709/223 |
| 2003/0073065 A1 * | 4/2003 | Riggs | 434/350 |
| 2003/0101091 A1 * | 5/2003 | Levin et al. | 705/11 |
| 2003/0129575 A1 | 7/2003 | L'Allier | |
| 2003/0182178 A1 | 9/2003 | D'Elena | |

(Continued)

OTHER PUBLICATIONS

"Introduction to Workforce Planning for IM/IT Personnel". Sep. 2001. Department of the Navy. Chief Information Officer.*

(Continued)

*Primary Examiner* — Peter Choi
(74) *Attorney, Agent, or Firm* — Bracewell & Giuliani LLP

(57) ABSTRACT

Systems, program products, and methods of human resources planning and development are provided. An example of a system includes a server in communication with a plurality of client computers over a communication network and program product stored in the memory of the server adapted to predict a future number of employees desired within the organization for a preselected period of time to define a human resource manning plan, to assign a plurality of employment development activities to each of a plurality of participating employees in the organization to define an employment development plan for each participating employee, to form a recruitment plan for the organization, and to provide continuous feedback loops so that revisions in the human resource manning plan, the recruitment plan, or at least one of the employment development plans are accounted for in each other of such plans.

32 Claims, 46 Drawing Sheets

U.S. PATENT DOCUMENTS

2004/0162748 A1* 8/2004 Vogel et al. ............... 705/8
2006/0184484 A1   8/2006 Al-Otaibi
2006/0195335 A1* 8/2006 Christian et al. ........... 705/1
2007/0203786 A1* 8/2007 Nation et al. ............. 705/11

OTHER PUBLICATIONS

"Workforce Planning and Professional Development Task Force Final Report—Positioning FHWA for the Future". Dec. 1, 2000. US Department of Transportation—Feeral Highway Administration.*

"Strategic Workforce Planning". Aug. 2003. Fairfax County Virginia.*

"Building Successful Organizations—Workforce Planning in HHS". Nov. 1999. United States Department of Health & Human Services. Office of Human Resources—Assistant Secretary for Management and Budget.*

"Workforce Planning Instruction Manual". Aug. 2001. United States Department of the Interior—Office of Personnel Policy.*

"Workforce Planning Guide". Apr. 1999. US Department of Transportation.*

International Search Report and Written Opinion for Related PCT Application PCT/US06/02178 dated Aug. 20, 2008.

* cited by examiner

HRDIS

Home  Preview  Details  Reports  Search     Admin  Relogin  Help

Employee Info — 156

Save    Confidential Info    Add New Employee

Position Pointer
Badge Number
Logon ID
First Name
Middle Name
Last Name
Initials Age:
Is Active?
Is Mentor?

Work Phone
Personal Phone
Personal E-Mail
Gender
Marital Status
No. of Children
Birth Date Organization
Job Title
Business Role
Discipline
Home Department
Host Department Grade Code
Category
Mentor
Service Date
Hire Date

HRDIS

Home Preview Details Reports Search | Admin Relogin Help

Education

Save

Add New Education

Education Type
Start Date  MM/DD/YYYY
School Name
Major
Concentration
Major GPA/4

Sponsor
Completion Date  MM/DD/YYYY
School Location
2nd Major
Status
Cumulative GPA/4

HRDIS

Home | Preview | Details | Reports | Search | | | Admin | Relogin | Help

Presentations — 168

Select Presentation ▽          Save          Add New Presentation

Subject

Description

Date ☐ MM/DD/YYYY

By
Status

HRDIS

Home  Preview  Details  Reports  Search  Admin  Relogin  Help

Workshops — 170

Select Workshop

Subject

Save     Add New Workshops

Description

Date              MM/DD/YYYY     By
Completion Date   MM/DD/YYYY     Status

HRDIS

Home  Preview  Details  Reports  Search          Admin  Relogin  Help

Select Technical Paper ▽          Add New Technical Paper — 174

Subject

Description

Date              MM/DD/YYYY     By
Completion Date   MM/DD/YYYY     Status

HRDIS

Home   Preview   Details   Reports   Search

5 YEARS INDIVIDUAL DEVELOPMENT PLAN (IDP)
SDP(InH)

| EMPL. NO. | NAME | SERVICE DATE | BIRTH DATE |
|---|---|---|---|
| 380227 | Billy Smith | 9/2/1989 | 8/23/1971 |

| DIVISION | UNIT | ORG CODE |
|---|---|---|
| ME&CCD | CTU | 714-230 |

| SPECIALTY/DISCIPLINE | PHASE | SDP START | SDP COMPLETE |
|---|---|---|---|
| Open Stream Corrosion | n/a | 6/1/15 | 8/1/2007 |

| JOB TITLE | JOB CODE | SALARY CODE | GRAD. DATE |
|---|---|---|---|
| Supervisor Engineering Services | 3811E | 13 | 10/1/2002 |

DEVELOPMENT ASSIGNMENTS

| Host | Description | StartDate | CompletionDate | Dept. Head Initial |
|---|---|---|---|---|
| RRD | Corrosion Engineer | 1/1/2005 | 12/31/2005 | |
| uok | Intern Assignment | 1/1/2006 | 12/31/2006 | |
| CSD/ME&CCD/CTU/Sa | Corrosion Engineer | 7/1/2006 | 6/30/2007 | |
| CSD/ME&CCD/CTU/Sa | Corrosion Engineer | 7/1/2007 | 12/30/2007 | |
| CSD/ME&CCD/CTU/Sa | Corrosion Engineer | 1/1/2008 | 6/30/2008 | |
| R&DC/MSD/CSU/Un | Corrosion Engineer | 7/1/2008 | 12/31/2008 | |

MANAGEMENT, PROFESSIONAL & TECHNICAL COURSES

| Start | Comp | Title |
|---|---|---|
| 5/4/2004 | 5/8/2004 | Salary Planning & Administration (SPA - Phase 2) |

| Supervisor Name : | Steve Smith | Signature : | Date : 4/17/2004 |
|---|---|---|---|
| Mentor Name : | Steve Jones | Signature : | Date : 4/17/2004 |
| Employee Name : | Bill Jones | Signature : | Date : 4/17/2004 |
| Division Head Name : | Al Smith | Signature : | Date : 4/17/2004 |

Human Resources Development Performance Indicator

| Degree | | Self-Development | | | Other | | | In-House | Out of Dept. | Relief | Act.% HRDPI% |
|---|---|---|---|---|---|---|---|---|---|---|---|
| Other | | | | | | | | | | | |

Innovations

| Unit | Division | Department | Admin. Area | Business Line | Company | Other Companies | Actual % HRDPI% |
|---|---|---|---|---|---|---|---|

Presentations (Delivered)

| Unit | Division | Department | Admin. Area | Business Line | Company | Other Companies | Actual % HRDPI% |
|---|---|---|---|---|---|---|---|
| | | | | | | Sub-Total | |

Workshops (Facilitated)

| Unit | Division | Department | Admin. Area | Business Line | Company | Other Companies | Actual % HRDPI% |
|---|---|---|---|---|---|---|---|

Technical Meetings (Written)

| Unit | Division | Department | Admin. Area | Business Line | Company | Other Companies | Actual % HRDPI% |
|---|---|---|---|---|---|---|---|
| | | | | | | Sub-Total | |

Technical Papers (Written)

| Unit | Division | Department | Admin. Area | Business Line | Company | Other Companies | Actual % HRDPI% |
|---|---|---|---|---|---|---|---|

Inventions

| Unit | Division | Department | Admin. Area | Business Line | Company | Other Companies | Actual % HRDPI% |
|---|---|---|---|---|---|---|---|
| | | | | | | Sub-Total | |

Recognitions

| Unit | Division | Department | Admin. Area | Business Line | Company | Other Companies | Actual % HRDPI% |
|---|---|---|---|---|---|---|---|
| | | | | | | Overall Total | |

*FIG. 36.*

HRDIS

Home  Preview  Details  Reports  Search  Admin  Relogin  Help

Total Records:

_____ 's History

| Badge | Name | History Effective Date | History Data | History Data Before | History Data After | History Modified By | History Modify Date |
|-------|------|------------------------|--------------|---------------------|--------------------|----|----|
|       |      |                        |              |                     |                    |    |    |
|       |      |                        |              |                     |                    |    |    |
|       |      |                        |              |                     |                    |    |    |
|       |      |                        |              |                     |                    |    |    |
|       |      |                        |              |                     |                    |    |    |
|       |      |                        |              |                     |                    |    |    |
|       |      |                        |              |                     |                    |    |    |

*FIG. 37.*

| Home | Preview | Details | Reports | Search | | | Admin | Relogin | Help |
|---|---|---|---|---|---|---|---|---|---|
| Bottom | | | | | | | Search | | Go |
| PP | Badge # | First Name | Last Name | GC | Category | Discipline | Job Title | | |
| ABC/23 | 84 | Sam | Brown | 15 | EuroS | Analysis | Manager | | |
| FDC/12 | 92 | Fred | Smith | 12 | SAS | Planning | Supervisor | | |
| RTS/98 | 109 | Jim | Wheeler | 23 | SAS | Analysis | Engineer | | |
| BLG/09 | 27 | Ed | Brown | 43 | EuroS | Planning | Supervisor | | |
| ERG/84 | 65 | Ed | Smith | 45 | EuroS | Civil Engineering | Engineer | | |
| ASD/32 | 98 | Joe | Wheeler | 77 | SAS | Finance | Engineer Assistant | | |
| BEF/87 | 79 | Frank | Smith | 49 | SAS | Analysis | Manager | | |
| QWE/02 | 92 | Bill | Brown | 26 | SAS | Mech. Engineer | Worker | | |

*FIG. 39.*

HRDIS

Home  Preview  Details  Reports  Search  Admin  Relogin  Help

PP  Badge #  First Name  Last Name  Category  Discipline  Job Title

Employee Development

Education
Type  Sponsor  Start Date  Comp. Date  School Name  Major  Status

Assignments
Start Date  Finish Date  Status

Courses
Status

180 → (Education)
184 → (Assignments)
182 → (Courses)

SYSTEMS, PROGRAM PRODUCTS AND METHODS OF HUMAN RESOURCES PLANNING AND DEVELOPMENT

RELATED APPLICATIONS

The present application is a continuation of and claims priority to and the benefit of U.S. patent application Ser. No. 11/334,213, now U.S. Pat. No. 7,672,861 titled "Systems, Program Products, and Methods of Human Resource Planning and Development," filed on Jan. 18, 2006, which claims priority to and the benefit of U.S. Provisional Application No. 60/645,822, titled "Systems, Program Products, and Methods of Human Resource Planning and Development," filed on Jan. 21, 2005, each incorporated herein by reference in its entirety.

BACKGROUND OF THE INVENTION

1. Field of the Invention

The present invention relates generally to enhancing human resource planning and development within an organization and, more particularly, to systems, program products, and methods for providing individual employee development plans for individual employees and future employee manning and recruitment plans for an organization.

2. Description of Related Art

Training and development of employees of an organization is important in many respects. Supervisors and managers, however, often spend a substantial amount of time personally organizing, managing, and evaluating the training and development of individual employees. Human resource development for individual employees generally includes inefficiencies such as considerable paper shuffling and disorganized data, as well as repetitions and duplications of information relating to employees. The amount of time supervisors or managers of an organization consume with the training and development of each individual employee often can be better utilized performing other more important tasks relating to the organization.

To address some of these inefficiencies, training and development programs have been developed which feature an annual performance appraisal system with established goals for employees. These programs, however, fail to include features of employee training and employee development for advanced organizational planning for the future. Accordingly, Applicants have realized that it is desirable to provide a system for optimizing human resource training and development for each individual employee in an organization, while providing a systematic organization of future employee development plans for each individual employee in the organization, as well as predictions and evaluations regarding future employee manning and recruitment plans for the organization.

SUMMARY OF THE INVENTION

In view of the foregoing, embodiments of the present invention advantageously provide enhanced systems, program products, and methods of human resource planning and development to allow an organization to track training and development of existing employees and to plan for future employee hiring needs within the organization. Embodiments of the present invention also advantageously provide systems, program products, and methods of human resource planning and development to allow quick changes in employee hiring needs responsive to changes in employee development. Embodiments of the present invention additionally advantageously provide systems, program products, and methods of human resource planning and development to enhance supervisor, mentor, and individual employee review, and feedback of employee development goals.

More specifically, an embodiment of a system to enhance human resource planning for an organization includes a first computer defining a server having at least one processor and memory operably coupled to the at least one processor, and adapted to be in communication with a communication network and in communication through the communication network with at least one, but more typically, a plurality of client computers each adapted to interface with a user and each positioned remote from the server but also in communication with the communication network. The system can also include human resource planning program product stored in the memory of the server to enhance human resource planning for an organization and/or embodied in separate computer-readable medium. An embodiment of the program product includes instructions that when executed by the server (or other computer configured therewith), causes the server to perform the operations of predicting a future number of employees desired within the organization for a preselected period of time, e.g., 10 years, responsive to preselected manning assumptions to thereby define or otherwise form a human resource manning plan having typically approximately 10 years of predicted human resource manning plan requirements, assigning, e.g., five years worth of employment development activities to each of a plurality of participating employees in the organization responsive to preselected employment development assumptions to thereby define or otherwise form an employment development plan for each participating employee, and forming a recruitment plan that supports the human resource manning plan responsive to preselected recruitment assumptions and responsive to information from the human resource manning plan.

The operations can also include providing a plurality of continuous feedback loops so that revisions in the recruitment plan, the human resource manning plan, or at least one of the employment development plans, are accounted for in each other of the plans (i.e. the at least one of the employment development plans, the recruitment plan, and the human resource manning plan). According to an embodiment of the method, the plurality of continuous feedback loops can include revising the at least one of the employment development plans responsive to revisions in the recruitment plan, revising the recruitment plan responsive to revisions in the human resource manning plan, and revising the human resource manning plan responsive to revisions in the at least one of the employment development plans and/or revisions in the recruitment plan.

The operations can also include requesting employment development activity data from a user to verify completion of the employment development activities supporting the respective employment development plan of each employee, and processing the employment development activity data to create a performance indicator for each participating employee in the organization responsive to completion of the employment development activities. According to an embodiment of the system/program product, the performance indicator can include a percentage point value for each activity completed and a point value for each activity in-progress required to meet a preselected performance development goal, and a percentage point value indicating a combination of the percentage point values for each of the plurality of employment development activities.

The operations can also include identifying a specific user accessing a human resource database at a particular point in time containing the employment development plan for each participating employee, providing a selected participating employee and mentor and supervisor for the selected participating employee within the organization with the right and ability to view and to modify the employment development plan for the participating employee, and providing an associated manager within the organization the right and ability to view but not to modify the employment development plan for the selected participating employee.

The operations can also include assigning a predicted future number of employees including permanent employees, temporary employees, and independent contractors of the organization in the human resource manning plan into a plurality of future employee groups, and associating the future number of employees within the future employee groups to a future calendar year. The operations can further include implementing real-time management decisions to determine the employment development activities for one or more of the participating employees, and implementing real-time management decisions in the human resource manning plan formulated responsive to at least one of the employment development plans and responsive to collective management discussions to determine the future number of employees in the human resource manning plan.

The system can also include one or more databases stored in memory accessible by the at least one processor of the server. The one or more databases can include data associated with the human resource manning plan to include data indicating the preselected manning assumptions, and data associated with the employment development plan to include data indicating the preselected employment development assumptions, the plurality of employment development activities, and a status indication of whether the employment development plan is in a request phase, a pre-approval phase, or an approval phase functioning to allow the server to update the human resource manning plan responsive to changes to the employment development plan. The one or more databases can further include data associated with the recruitment plan to include data indicating the preselected recruiting assumptions and data indicating a performance indicator for each of the employees in the organization responsive to completion of a plurality of employment development activities, whereby the performance indicators can include a point value for each activity completed or in-progress that are required, desired, preselected, or otherwise identified to meet a preselected performance development goal of the respective employee, and a point value indicating a combination of the point values for each of the plurality of employment development activities for the respective employee.

Embodiments of the present invention also include methods to enhance human resource planning for an organization. For example, a method to enhance human resource planning for an organization, according to an embodiment of the present invention, can include the steps of requesting human resource information from a user, accessing human resource information from a human resource database containing employee personal and work-related data. According to an embodiment of the method, the steps can include predicting a future number of employees desired within the organization for a preselected period of time, e.g., 10 years, responsive to preselected manning assumptions and/or responsive to the accessed human resource information to thereby define or otherwise form a human resource manning plan, forming a recruitment plan responsive to information from the human resource manning plan and responsive to preselected recruitment assumptions, and assigning a plurality of employment development activities to each of a plurality of participating employees in the organization to thereby define or otherwise form an employment development plan for each participating employee. The method can also include providing a plurality of continuous feedback loops so that revisions in either the human resource manning plan, the recruitment plan, or at least one of the employment development plans, are accounted for in each other of the plans (i.e., the human resource manning plan, the recruitment plan, and the at least one of the employment development plans). The plurality of continuous feedback loops can include revising the at least one of the employment development plans responsive to revisions in the recruitment plan, revising the recruitment plan responsive to revisions in the human resource manning plan, and revising the human resource manning plan responsive to revisions in the at least one of the employment development plans and/or revisions in the recruitment plan.

Embodiments of the present invention include many other benefits as well. For example, embodiments of systems, methods, and program product enable greater productivity and optimization of human resource development and training for all employees in the organization. Embodiments can also reduce or eliminate repetitions, duplications, and paper shuffling that were responsible for substantial inefficiencies in previous systems. Embodiments of systems, method, and program product improve the organization's plans relating to localization, recruitment, annual intakes, retirements, transfers within or outside of the organization, promotions, succession plans, and other benefits.

Embodiments of systems, methods and program product of the present invention enhance the quality of training and development activities, and can reduce administration time and wasteful communication by up to about 70%. Embodiments can also enhance training prioritization and budget spending. Embodiments of systems, method, and program product can further align training and development activities with the overall business strategy of the organization, thus a human resource tactical administrator is not necessary.

Embodiments of systems, methods, and program product of the present invention analyze the employment needs of the organization for a preselected period of time, e.g., approximately ten years, and provide an individualized development program for each employee for a preselected period of time, e.g., approximately five years. Embodiments also take better account of each individual employee's preferred learning style and invoke group learning whenever beneficial. Embodiments of systems, methods, and program product still further better identify promotable candidates, mark employment potential of employees, show the return on investment ("ROI") in training, and provide for greater accountability at all levels of employment.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 16 is a screen view displaying information associated with a position pointers icon on the system toolbar of a system to enhance human resource planning and developing according to an embodiment of the present invention;

FIG. 18 is a screen view displaying information associated with a disciplines icon on the system toolbar of a system to enhance human resource planning and developing according to an embodiment of the present invention;

FIG. 21 is a screen view displaying information associated with a common lists icon on the system toolbar of a system to enhance human resource planning and developing according to an embodiment of the present invention;

FIG. 22 is a screen view displaying information associated with an employee information icon on the system toolbar of a system to enhance human resource planning and developing according to an embodiment of the present invention;

FIG. 23 is a screen view displaying information associated with an education icon on the system toolbar of a system to enhance human resource planning and developing according to an embodiment of the present invention;

FIG. 24 is a screen view displaying information associated with a courses icon on the system toolbar of a system to enhance human resource planning and developing according to an embodiment of the present invention;

FIG. 25 is a screen view displaying information associated with an assignments icon on the system toolbar of a system to enhance human resource planning and developing according to an embodiment of the present invention;

Figure 27:
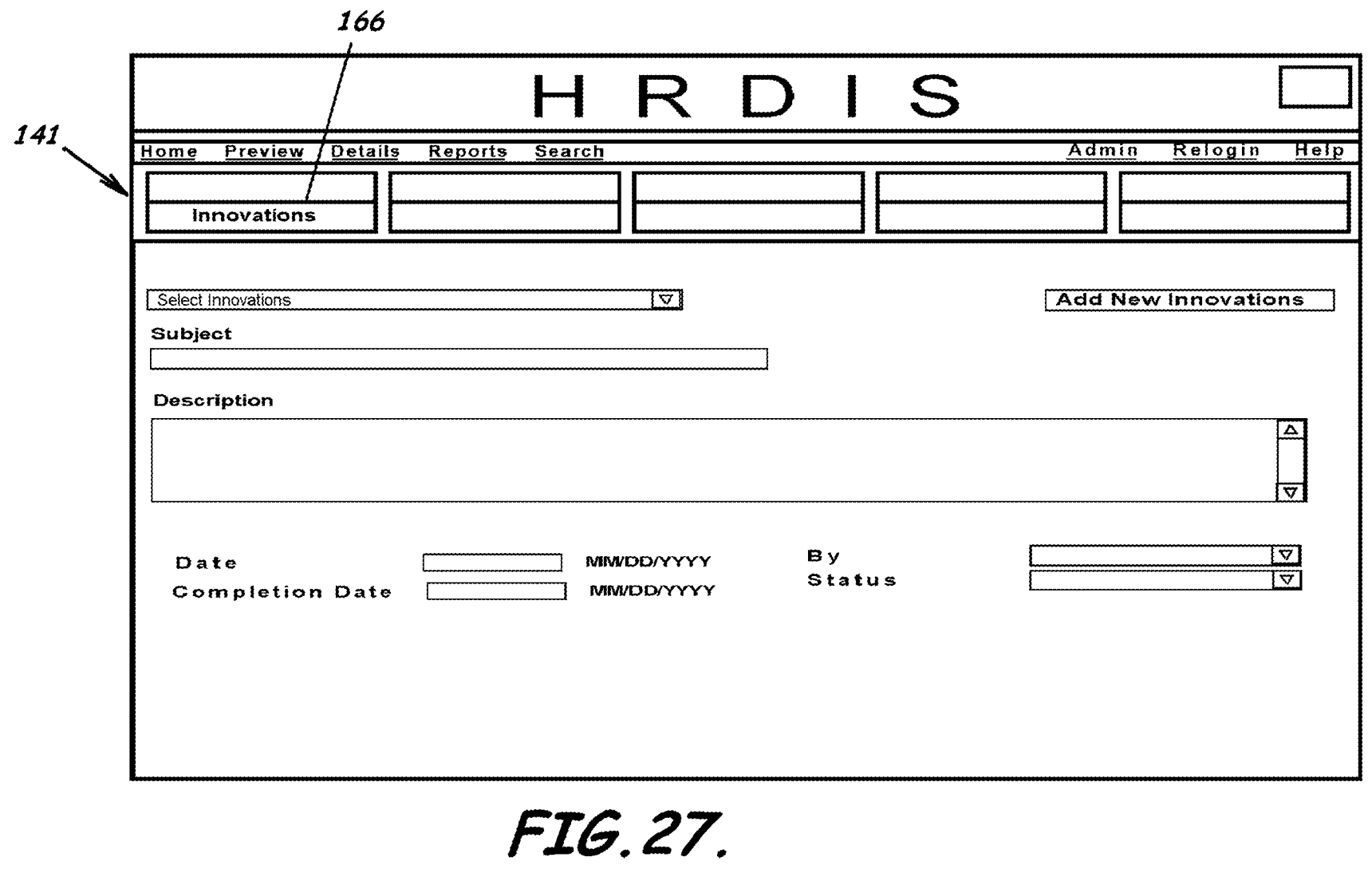

FIG. 27 is a screen view displaying information associated with an innovations icon on the system toolbar of a system to enhance human resource planning and developing according to an embodiment of the present invention;

FIG. 28 is a screen view displaying information associated with a presentations icon on the system toolbar of a system to enhance human resource planning and developing according to an embodiment of the present invention;

FIG. 29 is a screen view displaying information associated with a workshops icon on the system toolbar of a system to enhance human resource planning and developing according to an embodiment of the present invention;

FIG. 30 is a screen view displaying information associated with a technical meetings icon on the system toolbar of a system to enhance human resource planning and developing according to an embodiment of the present invention;

FIG. 31 is a screen view displaying information associated with a technical papers icon on the system toolbar of a system to enhance human resource planning and developing according to an embodiment of the present invention;

FIGS. 34A-C are screen views of exemplary data forms of an employment development plan for a participating employee according to an embodiment of the present invention;

FIG. 35 is a screen view displaying data field entries for a participating employee according to an embodiment of the present invention;

FIG. 36 is a screen view displaying a performance indicator for a participating employee according to an embodiment of the present invention;

FIG. 37 is a screen view displaying historical data of a participating employee for the employment development plan according to an embodiment of the present invention;

FIG. 39 is a screen view displaying an employee list for the employment development plan according to an embodiment of the present invention;

FIG. 40 is a screen view displaying information and activities for a participating employee according to the employment development plan according to an embodiment of the present invention;

Figure 41:
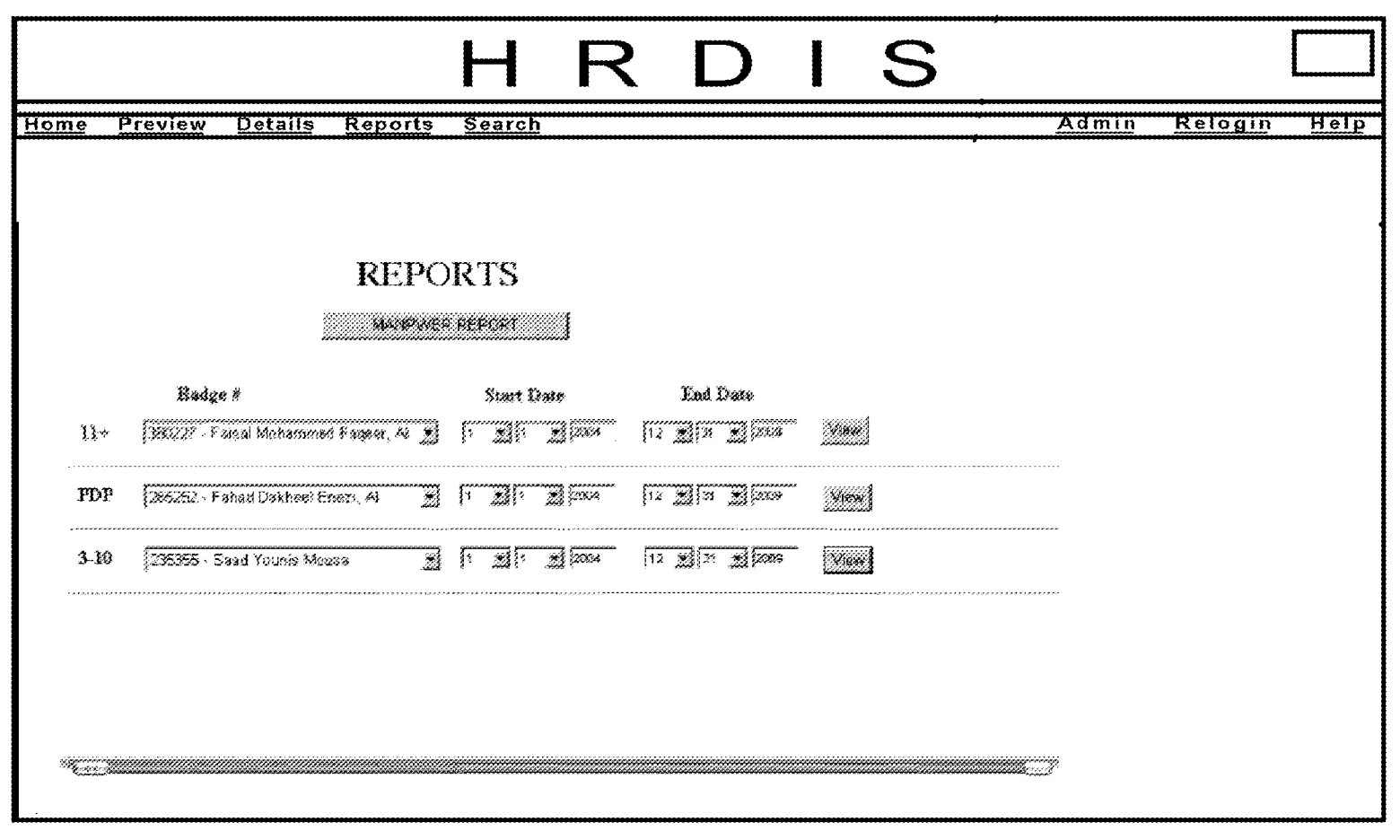

FIG. 41 is a screen view displaying a reports web page for the employment development plan according to an embodiment of the present invention; and FIG. 42 is a screen view displaying information for a human resource manning plan according to an embodiment of the present invention.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. The prime notation, if used, indicates similar elements in alternative embodiments.

Figure 1A:
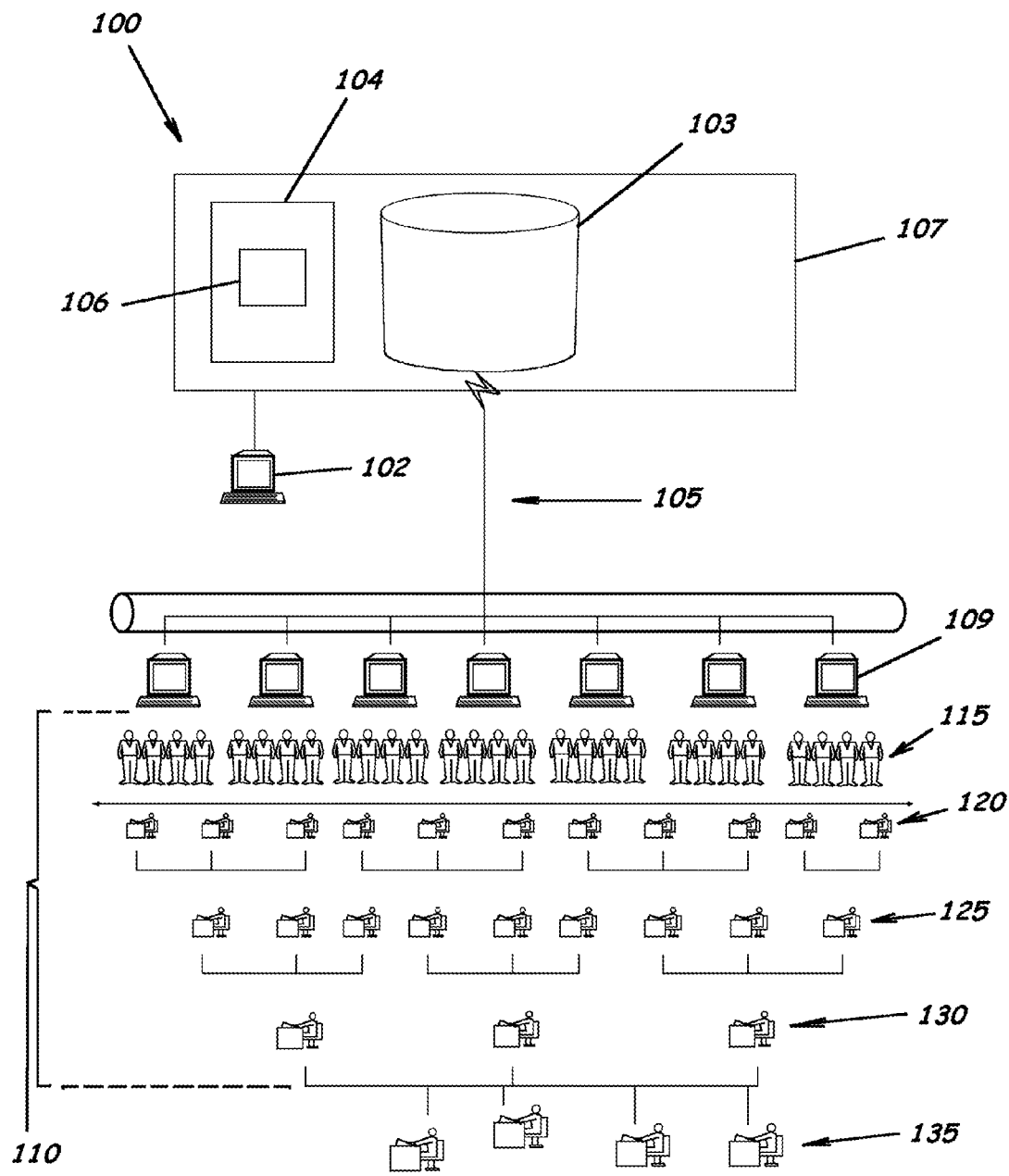
FIG. 1A is a schematic diagram of a system to enhance human resource planning and development illustrating a hierarchy of individuals within an organization with access to the system according to an embodiment of the present invention.

FIG. 1A shows a schematic diagram of a system 100 to enhance human resource planning for an organization according to an embodiment of the present invention, which can be arranged and programmed to perform the functionality or method of embodiments of the present invention. As shown, one of the embodiments of the system 100 includes a first computer defining a server 107 interfaced with a communication network 105, a plurality of client computers 109 interfaced with the communication network 105, and a plurality of potential users interfaced with the client computers 109. Each of the client computers 109 is remote from and in communication with the server 107 through the communication network 105. The server 107 has a database 103 and memory 104 associated therewith. The memory 104 contains computer program product 106 such as in the form of program code, programs, routines, and symbolic languages or instruction blocks that provide a specific set or sets of ordered operations that control the functioning of the hardware and direct its operation, as understood by those skilled in the art, to perform some of the features or the functionality of the computer system 100. Note, the memory 104 can include volatile and nonvolatile memory known to those skilled in the art including, for example, RAM, ROM, and magnetic or optical disks, just to name a few. Note, it should also be understood that the preferred server configuration is given by way of example and that other types of servers or computers configured according to various other methodologies known to those skilled in the art can be used.

The server 107 and client computers 109 can be a personal computer, mid-range computer, or a mainframe computer. The server 107, for example, can be a larger computer having more memory and features and the client computers 109 can be personal computers dispersed in an office environment and in connection through an Intranet network, for example. The server 107 can also represent a server or server cluster or server farm and is not limited to any individual physical server or computer. The computer/server 107 site may be deployed as a server farm or server cluster managed by a serving hosting provider. The number of computers/servers 107 and their architecture and configuration may be increased based on usage, demand and capacity requirements for the system 100.

Each of the computers 107, 109 can include a hard drive, a display or monitor such as a CRT, LCD, or other monitor screens. The computers 107, 109 can also include a database for storing information and memory in which computer programs may be stored or reside. The computers 107, 109 can also include one or more user interfaces such as keyboards, mice, data collections, touch-screens, graphical display toolbars and icons, or other devices, with which information and data are transferred between the user and the client computer 109. Other output devices may also be included such as printers, facsimile machines, and other such devices as understood by those skilled in the art. The server 107 and each of the client computers 109 also preferably include a central processing unit (CPU), a read-only memory (ROM), and a random-access memory (RAM), as understood by those skilled in the art. The computers 107, 109 may be a stand-alone system or part of a network such as a local-area-network (LAN) or a wide-area-network (WAN). The server 107 and client computer 109 can be interconnected among each other via a global communication network 105 such as the Internet, or a local communication Intranet network 105 accessible only within a particular organization. Users may access the server 107 through the client computer 109 via the communication network 105.

As understood by those skilled in the art, other computer system configurations can also be employed to perform the functionality of the invention, and to the extent that a particular system configuration is capable of performing embodiments of methods of the present invention.

Once the computers are programmed or loaded with software or program product to perform particular functions pursuant to instructions from program software that implements the functionality or method of this invention, such computer systems in effect become special-purpose computers particular to the functionality or method of this invention are as well known to those skilled in the art of computer systems.

In addition, computer programs or program product stored in a tangible computer medium implementing the functionality or method of this invention will commonly be nonvolatile, hard-coded type media distributed to users on a distribution medium, such as floppy disks, read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links, or other computer-readable medium. The term "computer-readable medium" encompasses distribution media, intermediate storage media, execution memory of a computer, and any other medium or device capable of storing a computer program implementing the functionality or methods of embodiments of the present invention for later reading by a computer system. The computer program will often be copied from the computer-readable medium to a hard disk or a similar intermediate storage medium. When the programs are to be run, they will be loaded either from their distribution medium or their intermediate storage medium into the execution memory of the computer, configuring the computer to act in accordance with the functionality or method of this invention. All such operations are well known to those skilled in the art of computer systems.

As understood by those skilled in the art, various software modules or program product can be used within the computer system in the embodiments of the invention. The client computer 109 has client software stored thereon that preferably includes software modules such as a client graphical user interface (GUI), a data generator, a data requester, a secure client connector, and a database of information, each of which is understood by those skilled in the art. The data requester requests data from a user, and the data generator generates the different user-specific employee forms displayed on the GUI in which information may be entered about the human resource manning plan or the employment development plan. The database 103 is used to store the employee forms and other information regarding the organization and its employees. The client computer GUI provides a visually pleasing graphical user interface on a monitor to facilitate the input and output of data by a user who is using the client software within the client computer 109. The secure client connector establishes a private communication session between the client computer 109 and the server 107.

As also understood by those skilled in the art, the server 107 may include software modules or program product such as a secure server connector, a client confirmer, a security check, a data mover, and a transmission confirmer. The secure server connector allows the client computer 109 to communicate with the server 107 while keeping the nature of the communications private. The client confirmer and the security component confirm the identity of the client computer 109, and effectively detect the specific user accessing the server database 103 at a particular point in time. The data mover receives data from the client computer 109, and transmits data among the several client computers 109 and the server 107. The transmission confirmer, for example, can verify that particular information in the database 103 has been transmitted to the several client computers 109.

The database 103 within the server 107 may itself include several sub-databases, which contain independent blocks of information. For example, one sub-database may include data relating to the human resource manning plan, and another sub-database may include data relating to the employment development plan. The main database preferably resides within the server 107, but can also be in other ways associated with the server 107 such as by communication with the server 107 via a LAN, via a global communications network such as the Internet, or via a local communications network such as an organization's Intranet. Also, for example, the server 107 can itself include one or more of a plurality of computers, each with a sub-database residing thereon.

Figure 1B:
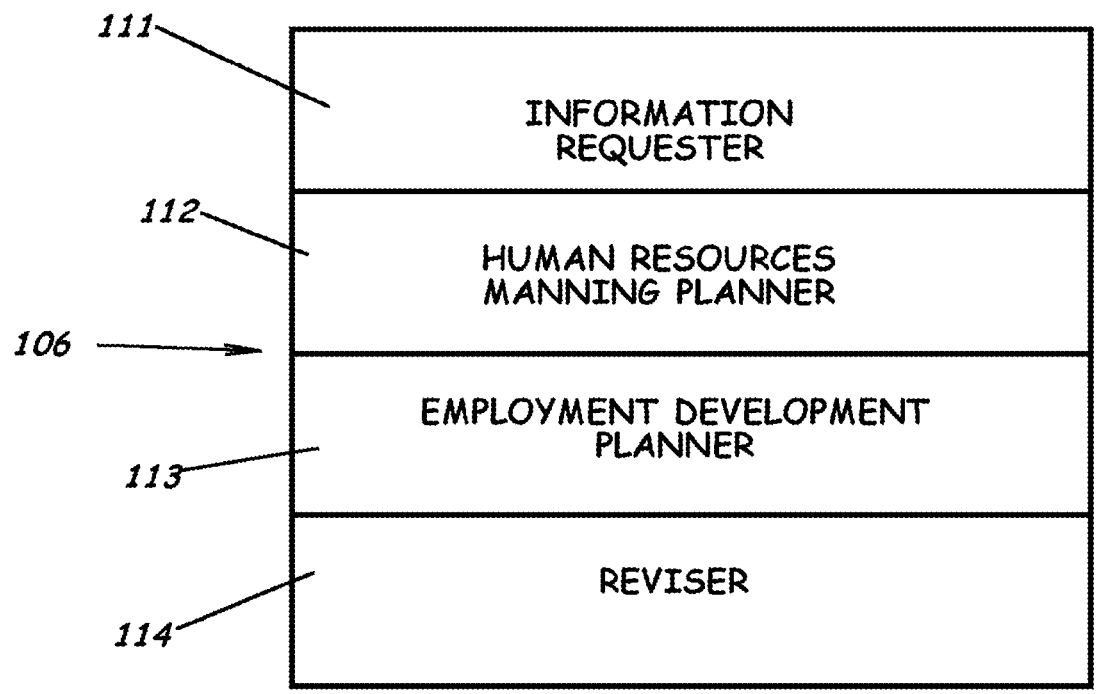
FIG. 1B is a block diagram of a computer program product to enhance human resource planning and development according to an embodiment of the present invention.
Figure 30:
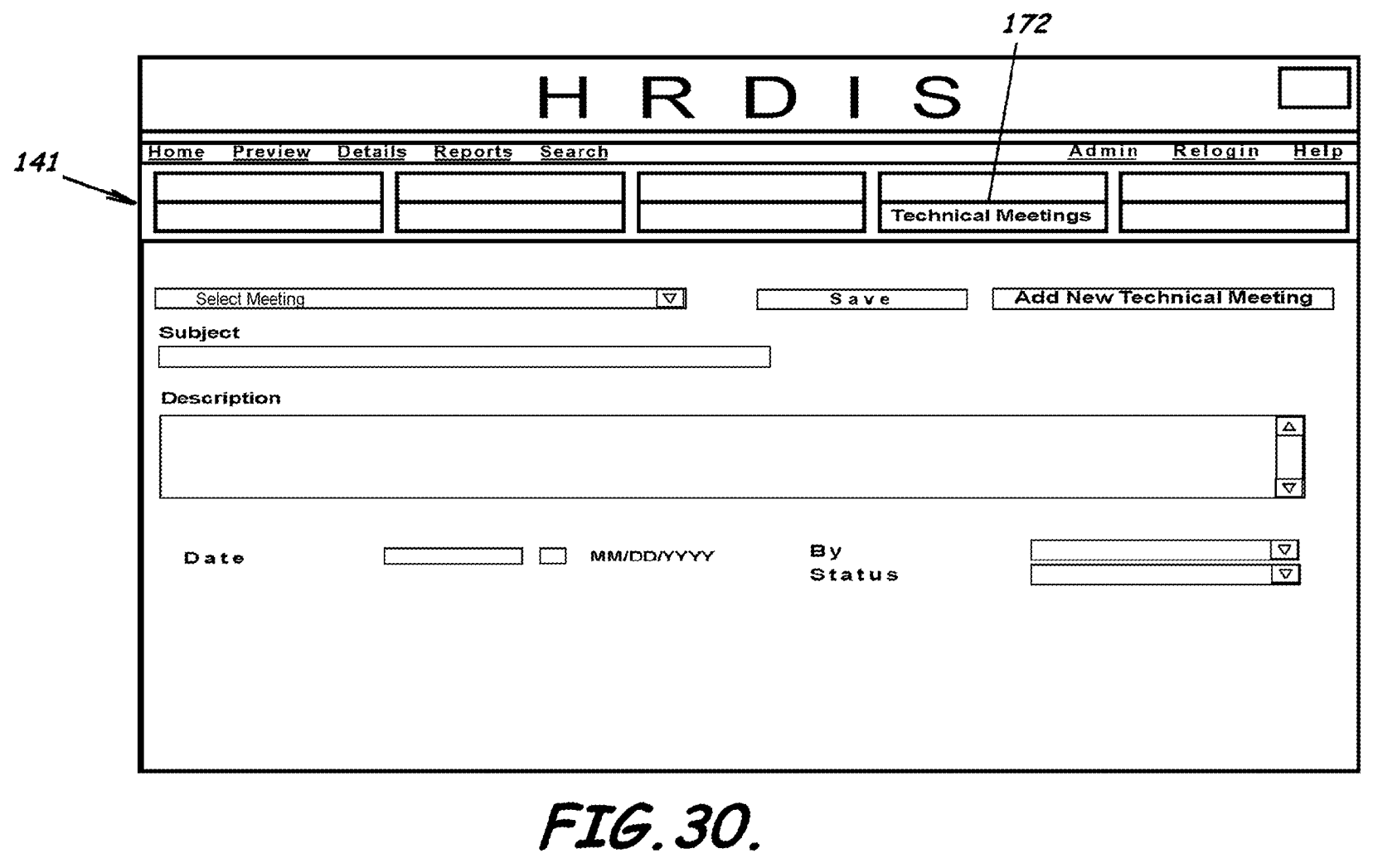

Program product 106 such as in the form of computer program code instruction blocks is stored in the memory 104 of the server 107 to perform the functionality of the computer system 100. As shown in FIG. 1B, the instruction blocks can be in the form of the following: a requester 111 including information-request instructions to request human resource information from the user and to access human resource information from the human resource database 103, a manning planner 112 including human resource manning plan instructions or code responsive to preselected manning assumptions to process the human resource information and to predict a future number of employees desired within the organization for a preselected period of time to thereby define a human resource manning plan (see FIG. 30), a development planner 113 including employment development plan instructions or code responsive to preselected employment development assumptions to process the human resource information and to assign a plurality of employment development activities to each of a plurality of participating employees in the organization to thereby define an employment development plan for each participating employee, and a reviser 114 including revision instructions to revise the human resource manning plan responsive to information generated by the employment development plan and to revise the employment development plan responsive to revisions in the human resource manning plan.

Figure 1C:
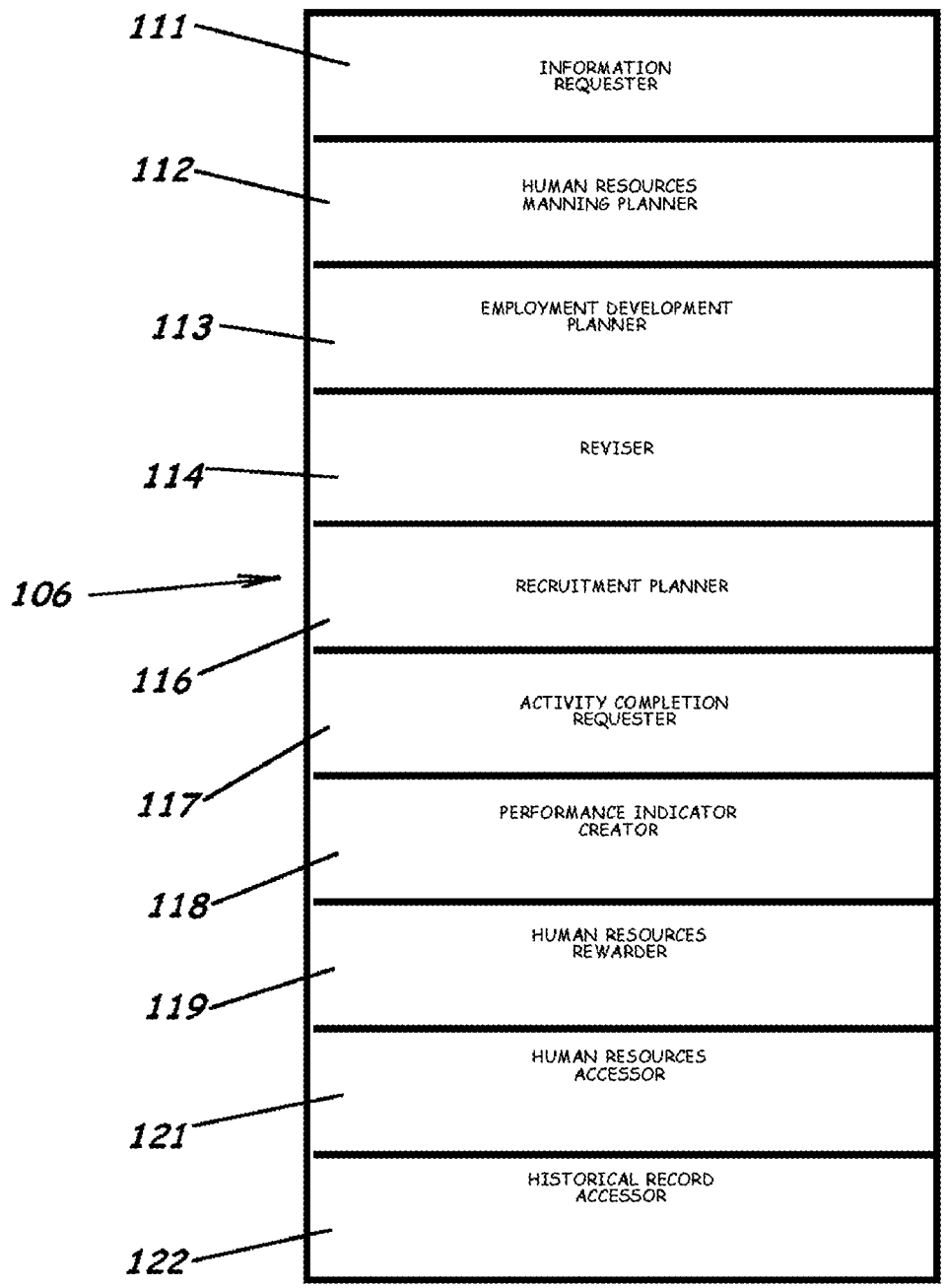
FIG. 1C is a block diagram of a computer program product to enhance human resource planning and development according to an embodiment of the present invention.

As shown in FIG. 1C, other program code instruction blocks can also be included in the human resource program product 106 stored in the memory 104 of the server 107. Such instruction blocks can be in the form of the following: a recruitment planner 116 including recruitment plan instructions to process the human resource information to create a recruitment plan responsive to information from the human resource manning plan and the employment development plan and responsive to preselected recruitment assumptions, an activity completion requester 117 including instructions to request employment development activity data from the user to verify completion of the employment development activities, a performance indicator creator 118 including performance indicator instructions to process the employment development activity information to create a performance indicator for each employee in the organization responsive to completion of the employment development activities, a rewarder 119 including instructions to reward a number of points to the participating employee responsive to the participating employee's completion of one of the activities in the employment development plan, and a human resources accessor 121 including instructions to provide a limited number of individuals within the organization with the right and ability to modify the employment development plan for a participating employee.

The system 100 can also include a security check included within the program product 106 or in communication with the program product 106, to identify the specific user accessing the database 103 at a particular point in time, and an assigner including instructions to assign the predicted future number of employees into a plurality of future employee groups 115 and to associate the future number of employees within the future employee groups 115 to a future calendar year. The human resource planning program product 106 can further include a displayer including instructions to display the human resource manning plan to a viewer through a graphical user interface, a decision manager including instructions to implement real-time management decisions to determine the future number of employees in the human resource manning plan, an implementer including instructions to implement real-time management decisions to determine the employment development activities for the participating employee, and a second displayer including instructions to display the employment development plan for a participating employee to a viewer through a graphical user interface. The human resource planning program product 106 further can include a historical record accessor 122 including instructions to access a historical record of the participating employee's development within the organization. Thus, program code or instruction blocks 106 operate to perform the features and the functionality of embodiments of the system 100, according to embodiments of the present invention.

The system 100, for example, can be run from a conventional zero-based manning operation, or alternatively, from a conventional best-guess standard manning operation, both of which can be established in connection with the central server database 103. The manning operation includes inputting a number of employees and their positions within the organization into a database 103 and updating the information periodically.

As understood by those skilled in the art, the database 103 for embodiments of the human resource planning and development system 100, for example, can reside in a web-based intranet server 107. The system 100 can also include Microsoft, SAP, and Oracle web-based applications, which can read from each other. The system 100 typically features a search engine for user convenience. The system 100 also typically has a robust security system, as understood by those skilled in the art, which is able to decipher the particular user that is entering each letter into the database 103.

Figure 2:
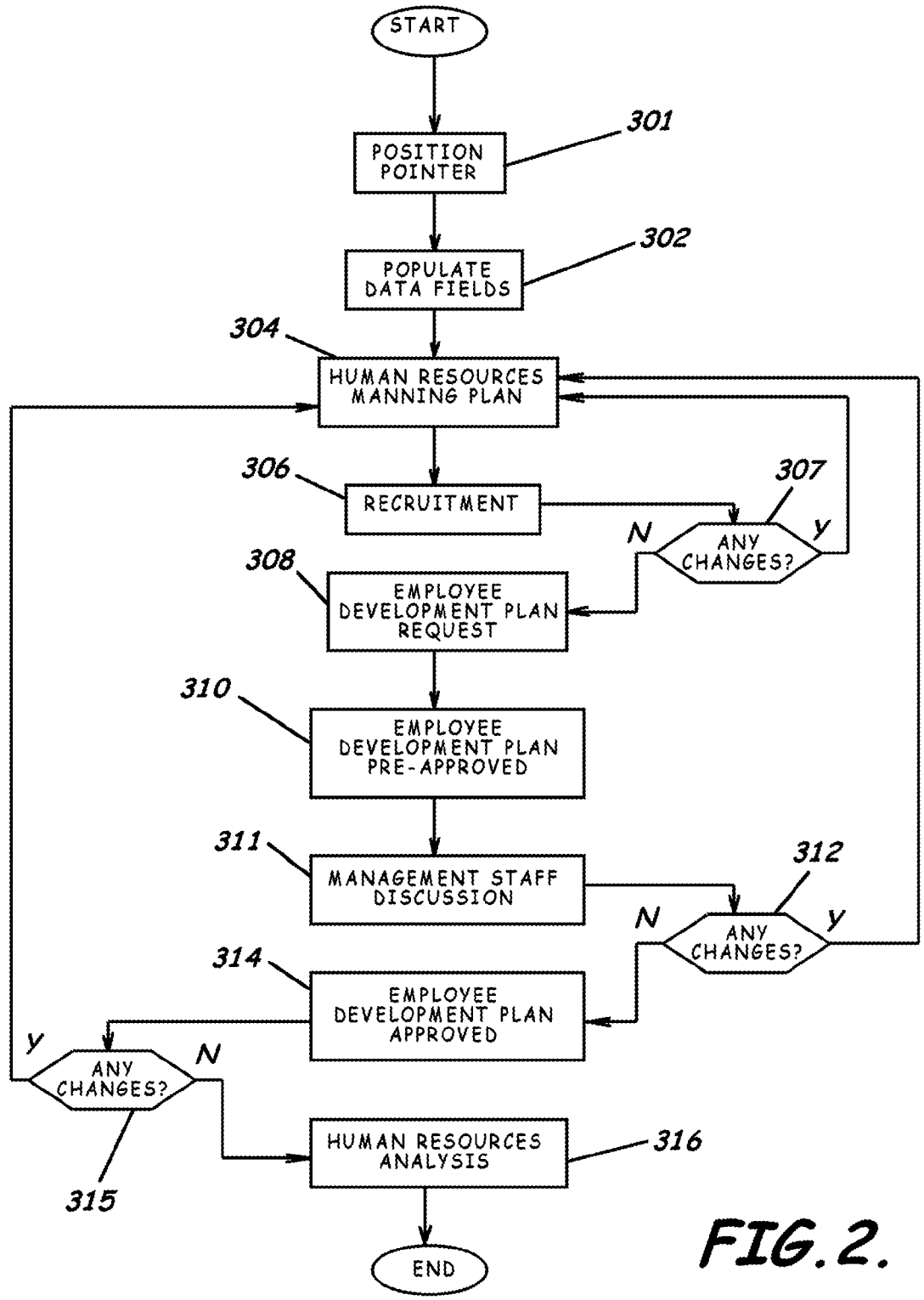
FIG. 2 is a block diagram of operations of a system to enhance human resource planning and development within an organization according to an embodiment of the present invention.
Figure 3:
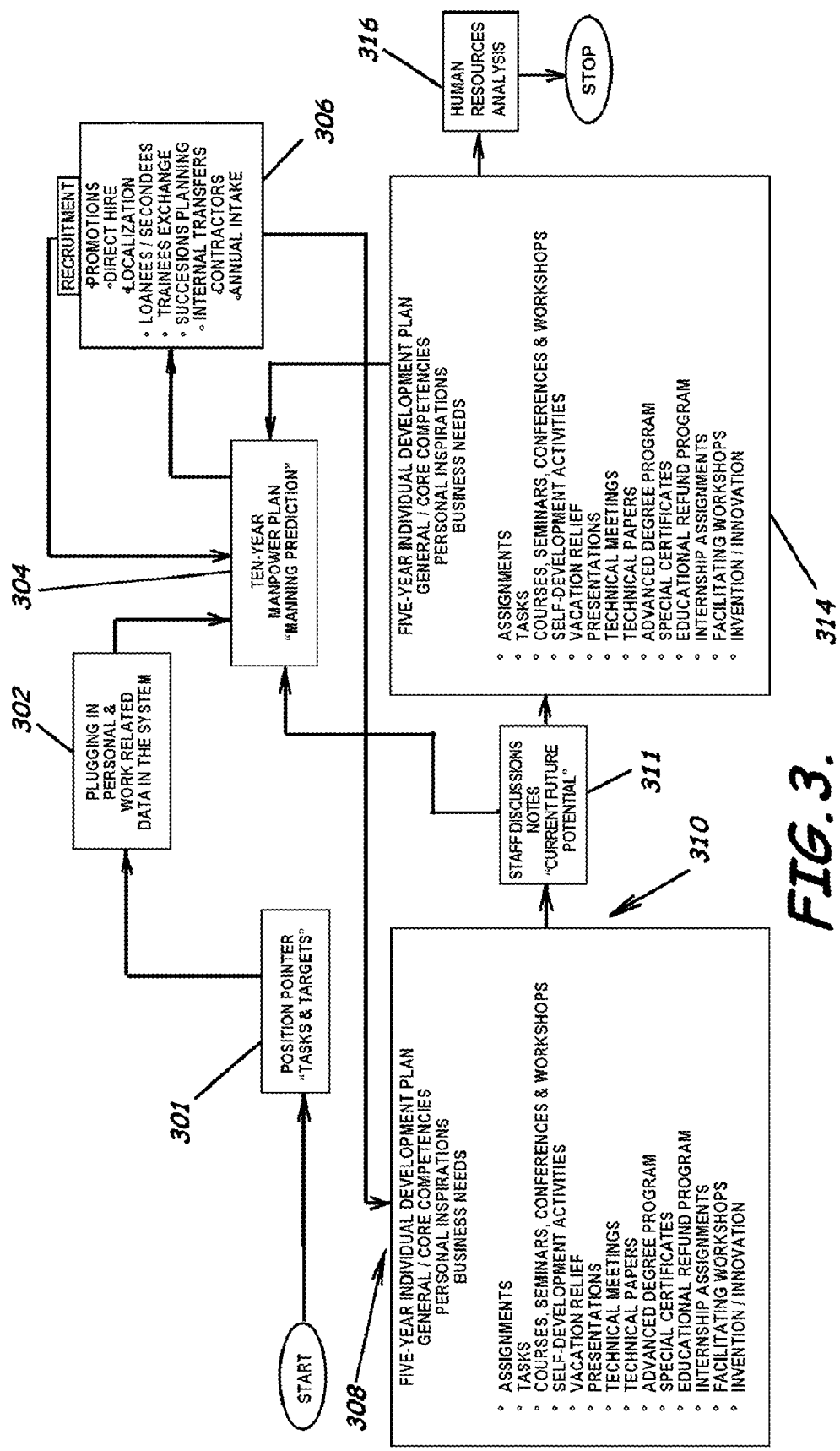
FIG. 3 is a block diagram of operations of a system to enhance human resource planning and development within an organization according to an embodiment of the present invention.

FIGS. 2-12, for example, illustrate the flow or operation of an embodiment of the system 100 of the present invention. As will be understood by those skilled in the art, FIGS. 2-3 illustrate an overview of the operation, and FIGS. 3-12 illustrate more details of the steps in the overviews. The user interacts with the system 100 through a graphical user interface (GUI), which may feature varying screen views or front plan views displayed on a monitor of a computer. Some screen view images of an embodiment of the invention are illustrated in FIGS. 13-42. The particular features of the GUI screen views depend upon the relative phase of the process being used or implemented by a user.

As shown in FIGS. 2-3, the process starts with the position pointer (see block 301) where employees are assigned to positions within the organization. Then the data fields are populated (see block 302), where personal and work related data are entered into the system. This information is used to construct a human resource manning plan (see block 304). The next step considers recruiting information (see block 306), and if there are any changes to the existing data in the system (see block 307), the new information is routed or fed back to the human resources manning plan. If, however, there are no informational changes (see block 307), the process continues to construct an employee development plan. The first phase of the employee development plan is the REQUEST phase (see block 308), which leads to the second PRE-APPROVAL phase of the employee development plan (see block 310). After the employee development plan is PRE-APPROVED, management has a staff discussion (see block 311). If any changes are made as a result of the staff discussion (see block 312), the new information is routed or fed back to the human resource manning plan. If, however, there are no informational changes (see block 312), the process continues to APPROVAL of the employee development plan (see block 314). If it provides new information (see block 315), data from the final approved employee development plan is routed or fed back to the human resource manning plan. If, however, there are no informational changes to the employee development plan (see block 315), the process continues to the final human resources analysis (see block 316).

Figure 4:
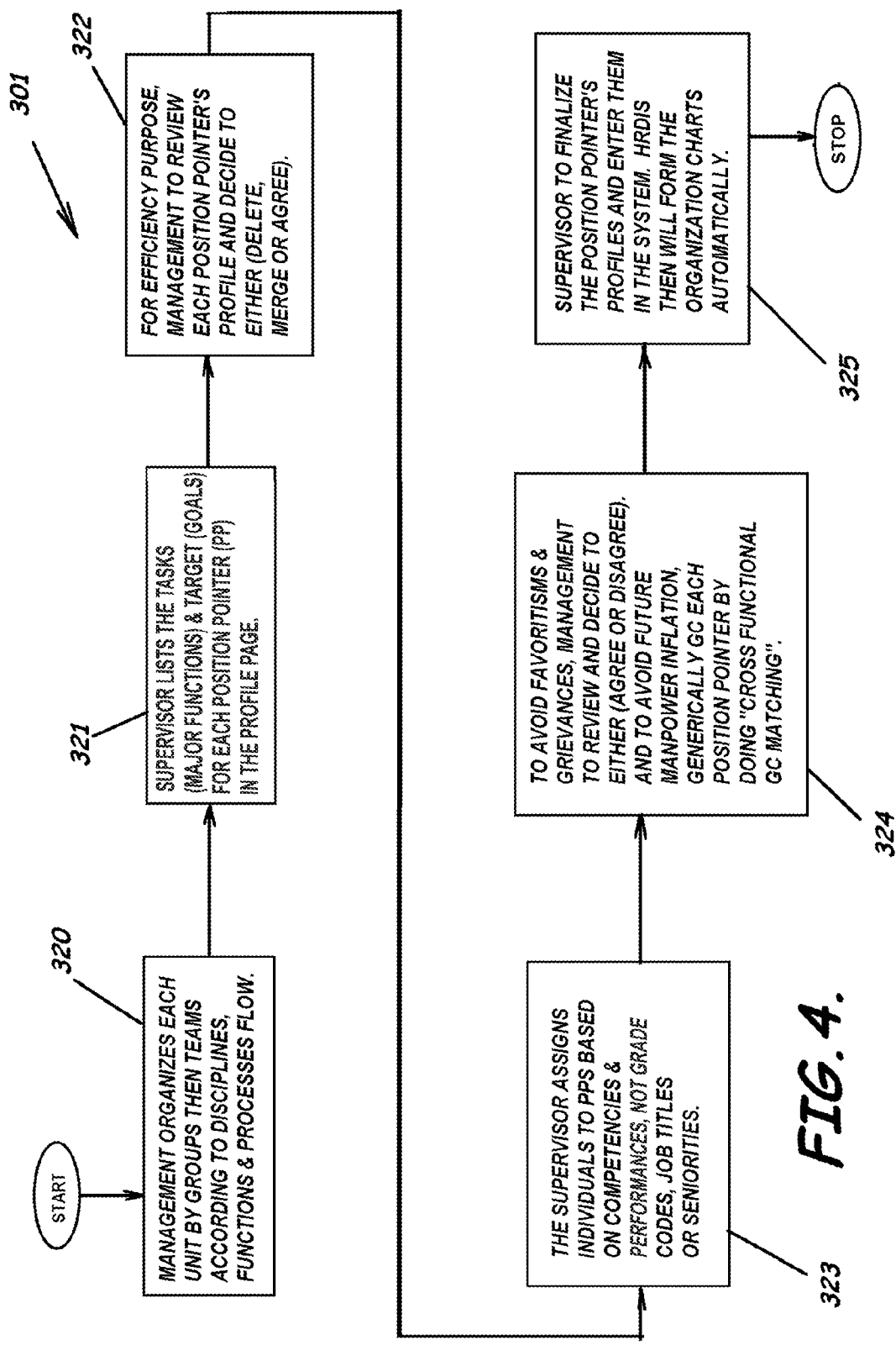
FIG. 4 is a block diagram of operations of a system to enhance human resource planning and development within an organization according to an embodiment of the present invention.

FIG. 4 shows a detailed illustration of an embodiment of the position pointer process (see block 301). Management 135 often organizes the employees by groups and teams according to disciplines, functions, processes, data flow, employee tasks, and individual goals (see block 320). In FIG. 1A, for example, each unit 110 is arranged in a personnel hierarchy and includes an employee group 115, a mentor 120, a supervisor 125, and a manager 130, respectively in order of hierarchical superiority. The supervisor 125 enters into the database 103 the major functions or tasks of each employee, as well as the employee's targets or goals, in order to create the profile page for the employee (see block 321). For purposes of efficiency, the manager 130 can review each position pointer profile and decide whether to agree or disagree with the major functions inputted by the supervisor 125 (see block 322). The supervisor 125 then assigns the employee to a unique employee group 115 based upon competencies and performances of the employee (see block 323).

More specifically, as shown in FIG. 1A, the authoritative personnel hierarchy is as follows: each employee group 115 reports to a mentor 120, each group of mentors 120 reports to a supervisor 125, and each group of supervisors 125 reports to a manager 130. Finally, each manager 130 disseminates and discusses relevant business concerns with management personnel 135 such as an HRDIS administrator, a department manager, a training coordinator, and/or a training coordinator's assistant. Within each level of the personnel hierarchy, only those directly linked to a particular employee through the personnel hierarchy have data access authorizing them to view and analyze the employee information.

To promote efficiencies within the system, as well as to avoid favoritism and grievances, management 135 reviews the supervisor's 125 description of each individual employee's profile, and decides whether to either agree or disagree with the supervisor's 125 employee assignment decision (see block 324, FIG. 4). If management 135 does not agree, management 135 may request or demand that the employee be deleted from the assigned employee group 115 and entered into a different employee group 115. After management 135 makes the appropriate decision, the supervisor 125 finalizes each employee's profile within the proper employee group 115, and inputs the information into the HRDIS database 103 (see block 325).

Figure 5:
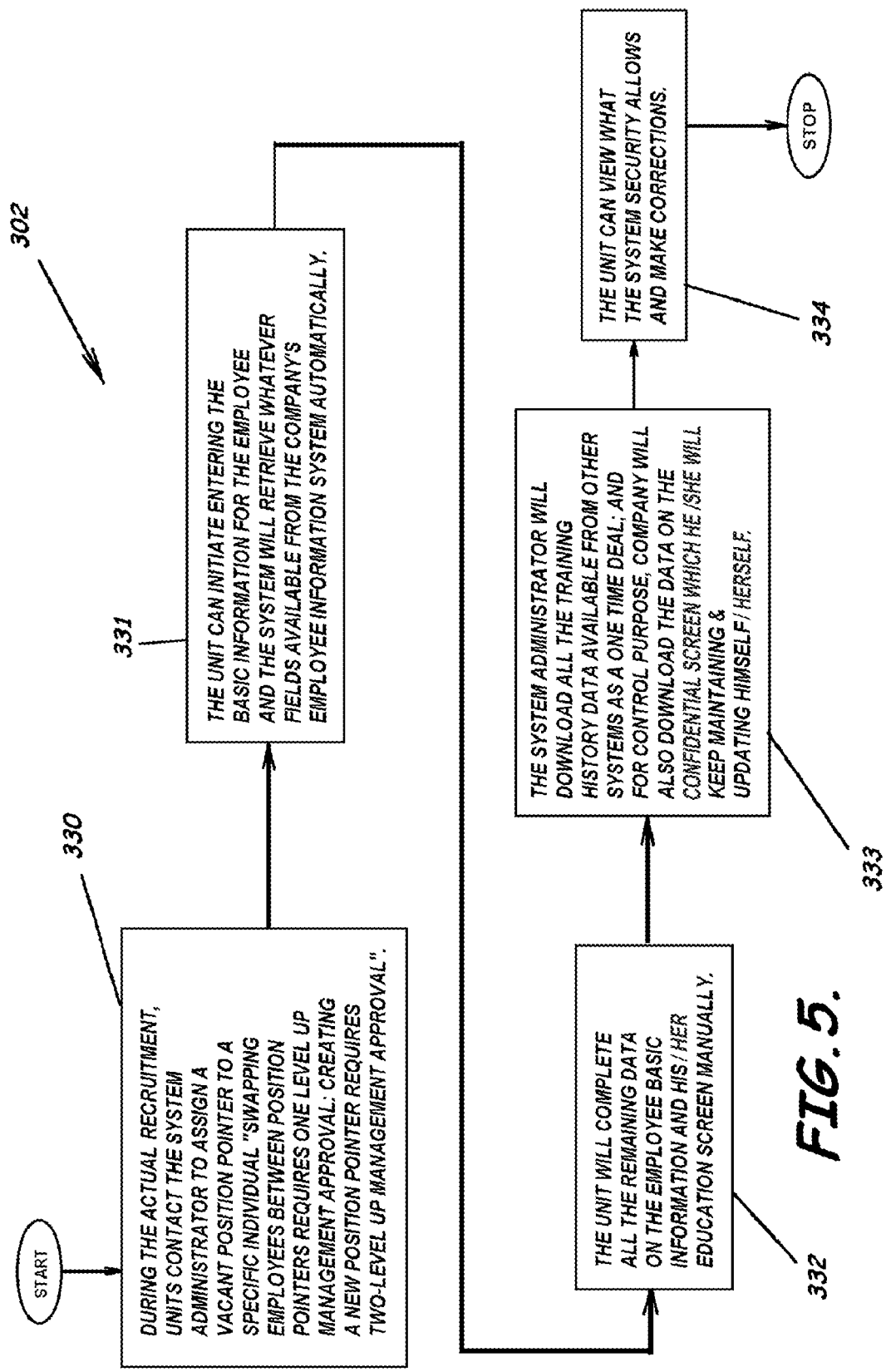
FIG. 5 is a block diagram of operations of a system to enhance human resource planning and development within an organization according to an embodiment of the present invention.
Figure 6:
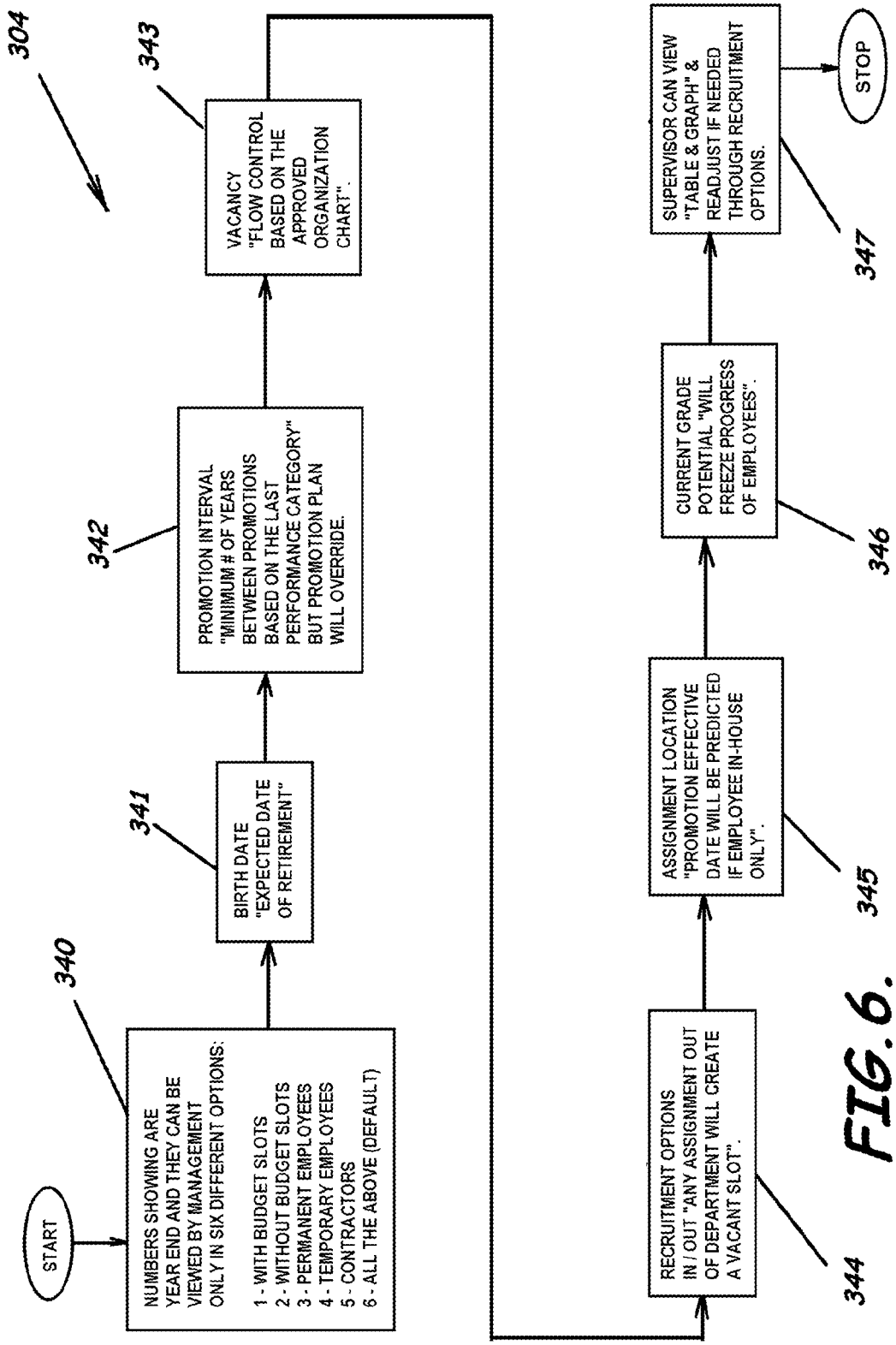
FIG. 6 is a block diagram of operations of a system to enhance human resource planning and development within an organization according to an embodiment of the present invention.

FIG. 5 shows a detailed illustration of an embodiment of the process of populating data fields (see block 302). Each time a new employee is hired, for example, the supervisor 125 or manager 130 of each unit 110 contacts the system administrator 102 to assign a particular individual to fill a vacant position within a specific employee group 115 (see block 330). The system 100 can request a wide range of personal and professional/educational information, which may be entered by a varying number of individuals. The supervisor 125 or manager 130 of the unit 110 can enter the basic information for the employee, or the employee can enter the basic information himself or herself, and the system 100 can responsively update the remaining fields of the employee profile by accessing information available from the company's employee information database completed by human resource (see block 331). Personnel within the unit 110 manually complete any ambiguous or empty remaining data fields relating to the employee's basic personal information and professional/educational information (see block 332). The human resource system administrator 102 downloads all training history data for the employee that is available from other systems (see block 333). For purposes of control and security, the system administrator 102 also downloads the employee data that is displayed on the confidential screen, which is maintained and updated periodically (see block 334).

Figure 13:
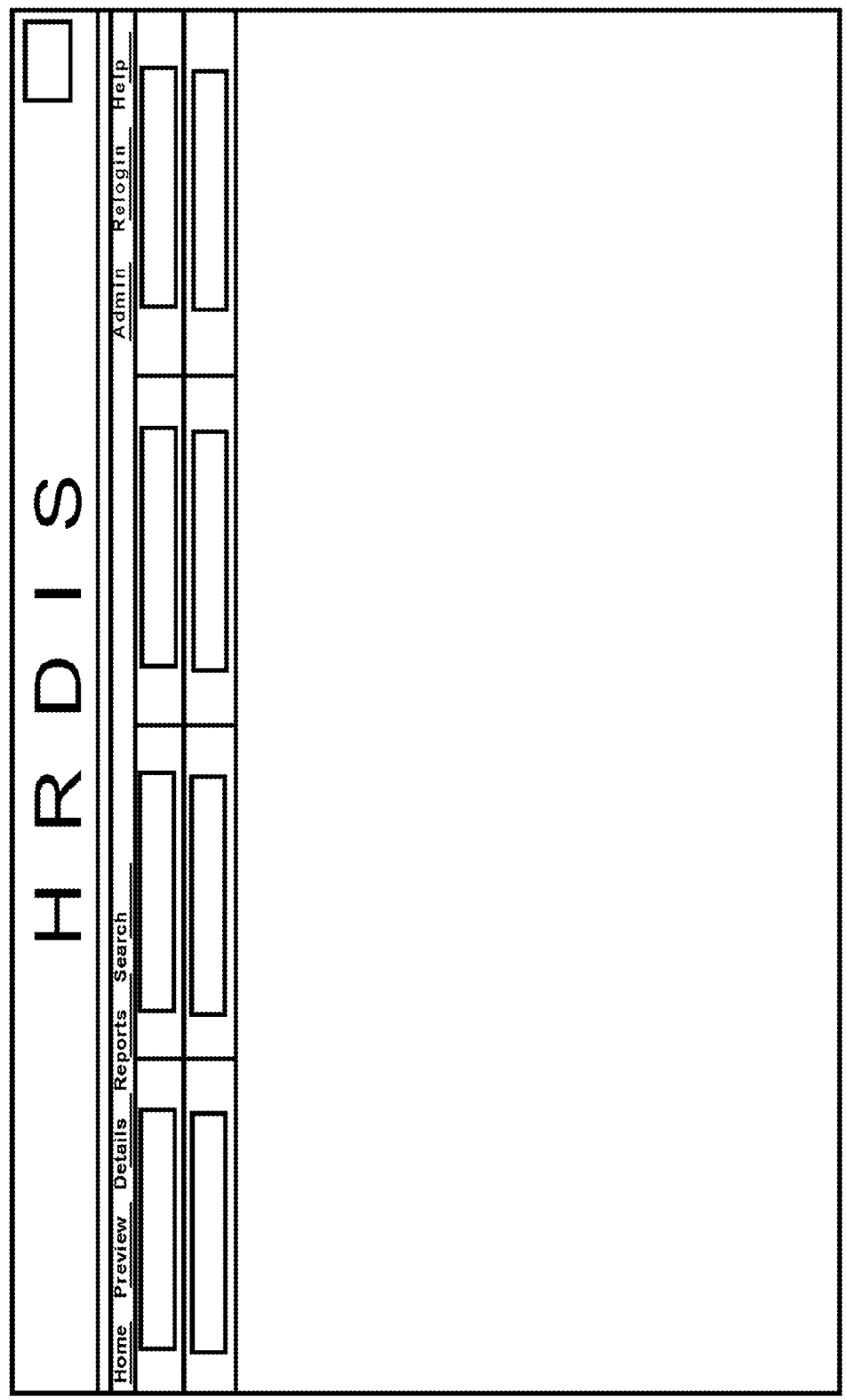
FIG. 13 is a screen view (i.e., front plan view) from a user interface displaying icon options from a system toolbar of a system to enhance human resource planning and developing according to an embodiment of the present invention.

When entering information into the system 100 or viewing information from the system 100, the user may select from a number of toolbar 141 options displayed on a graphical user interface to the user from the web-based intranet server, as shown, for example, in the screen view of FIG. 13. As understood by those skilled in the art, the instruction blocks of the human resource planning program product 106 in the memory 104 can provide instructions to implement a graphical user interface with a toolbar 141 and icons. The instruction blocks also provide instructions to disclose information from the database 103 on the graphical user interface relating to subject matter represented by the specific icons on the toolbar 141. In addition, the instruction blocks in the memory 104 can provide instructions granting the user the ability to access the information relating to the specific icons on the toolbar 141 of the graphical user interface, and can also provide instructions enabling the user to input information into the graphical user interface or modify information existing on the graphical user interface.

For example, as shown in FIG. 13, when the user selects or clicks a particular icon on the toolbar 141, the instruction blocks of the computer program product 106 in the memory 104 instructs the system 100 to show input and/or output fields for entry and/or display of information relating to that particular icon on the graphical user interface.

Figure 14:
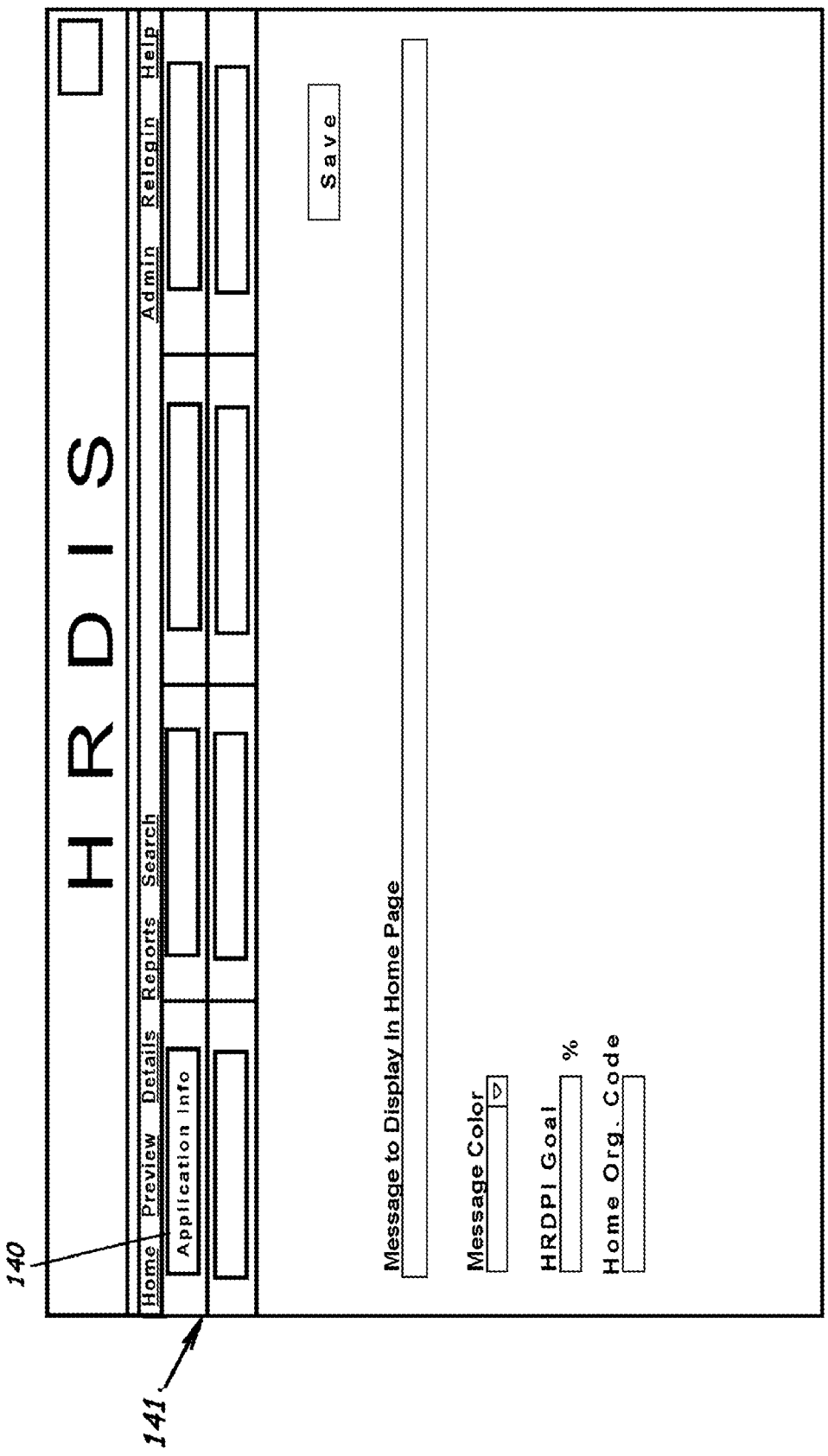
FIG. 14 is a screen view displaying information associated with an application information icon on the system toolbar of a system to enhance human resource planning and developing according to an embodiment of the present invention.
Figure 15:
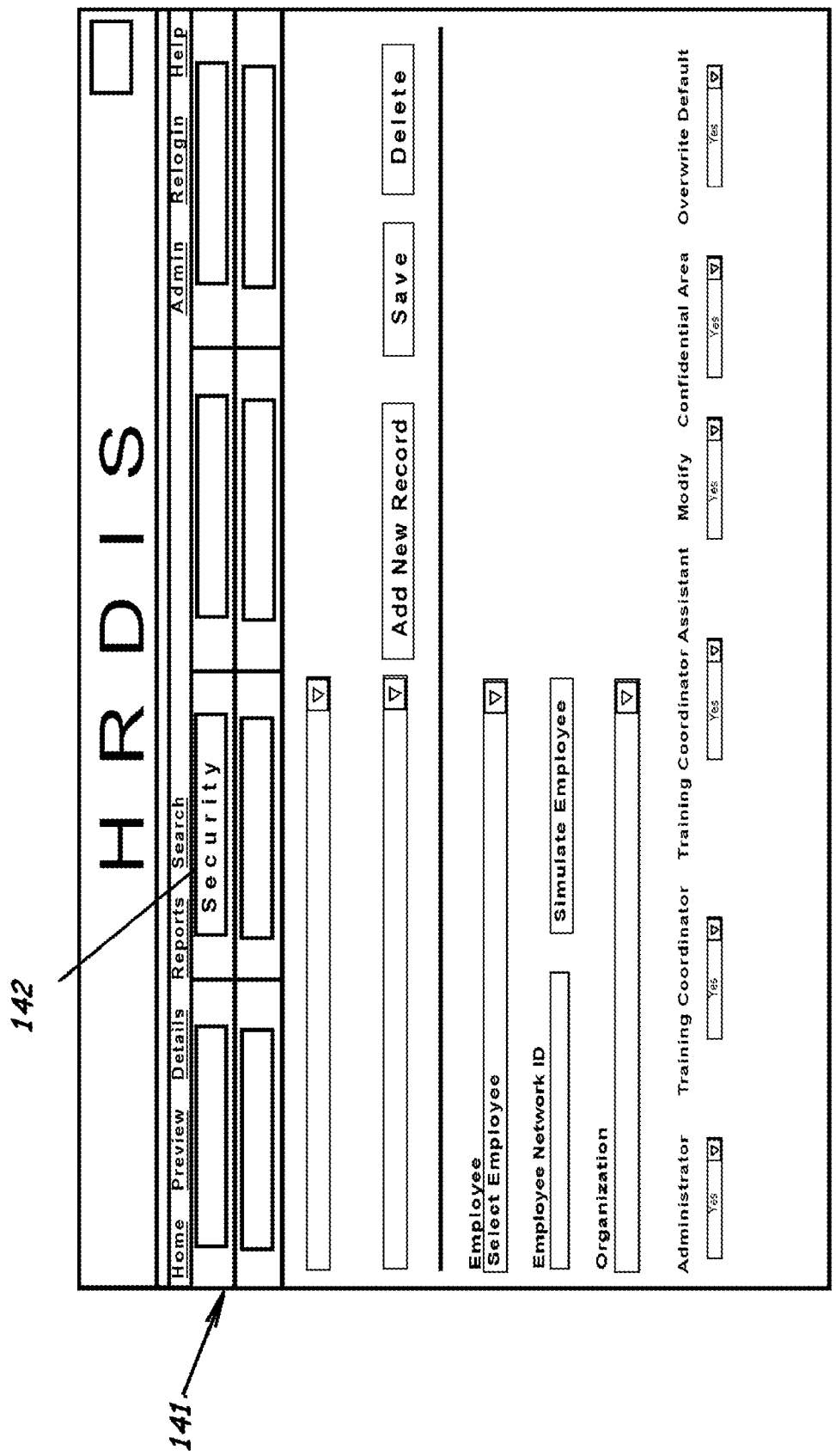
FIG. 15 is a screen view displaying information associated with a security icon on the system toolbar of a system to enhance human resource planning and developing according to an embodiment of the present invention.

FIG. 14 shows information displayed in response to selection of an application information icon 140 on the system toolbar 141 which, for example, can include a message to display on the homepage of the website. FIG. 15 shows information displayed in response to selection of the security icon 142 on the system toolbar 141, which can include the employee's standing within the organization, as well as information pertaining to the employee's network ID.

Figure 16:
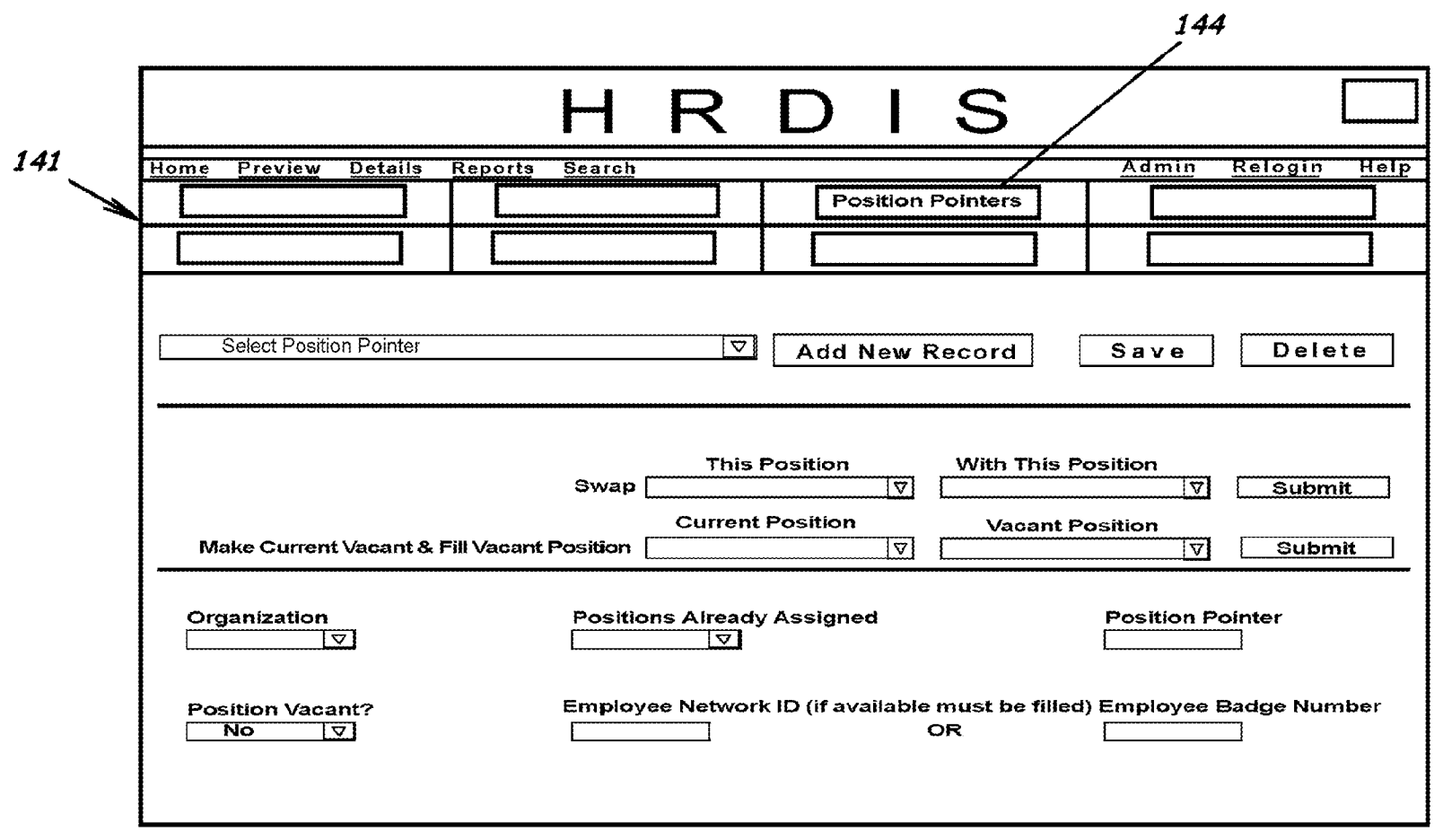
Figure 17:
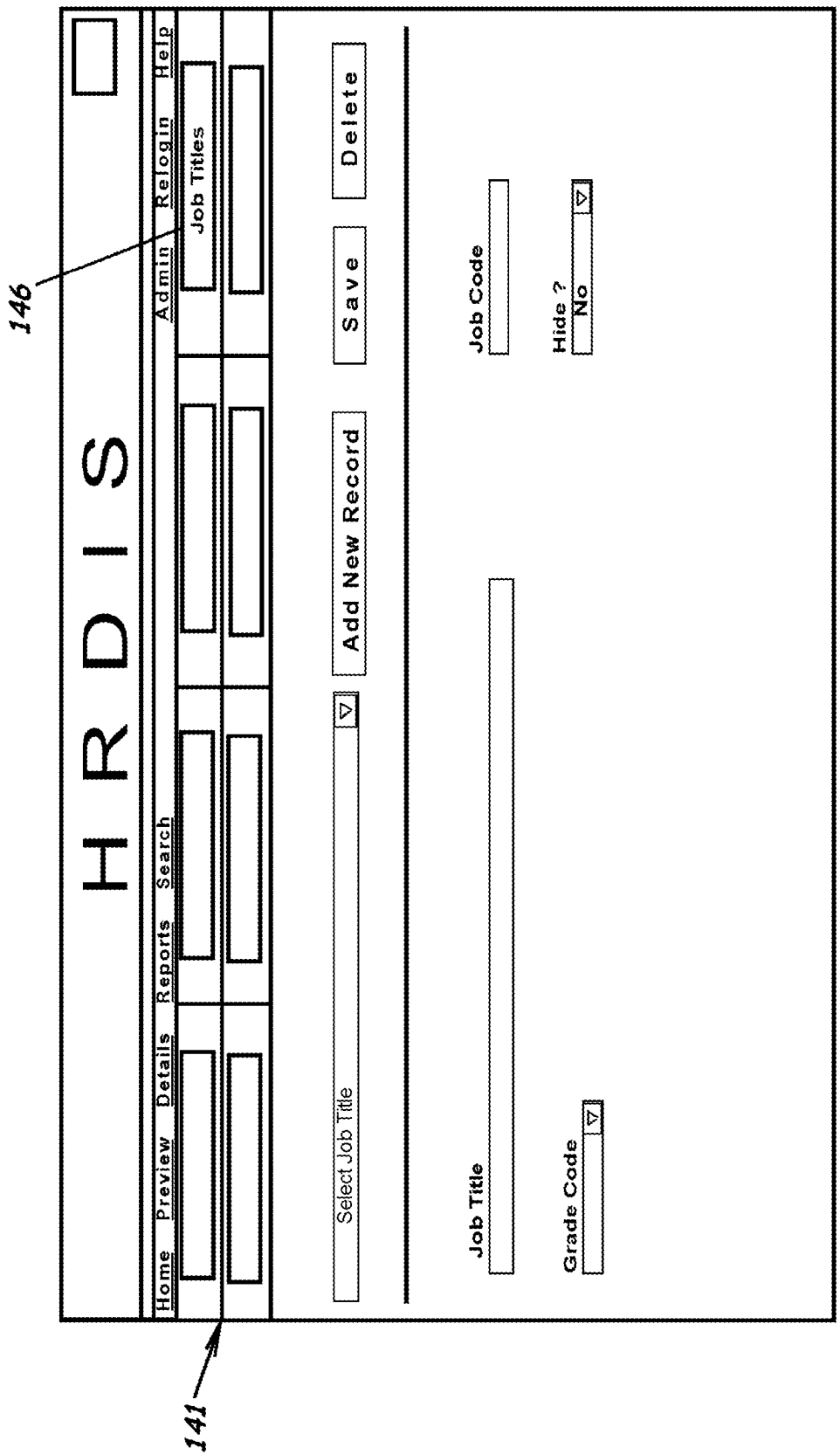
FIG. 17 is a screen view displaying information associated with a job titles icon on the system toolbar of a system to enhance human resource planning and developing according to an embodiment of the present invention.

FIG. 16 shows information displayed in response to selection of a position pointers icon 144 on the system toolbar 141, which can include information regarding an employee's position, tasks, and/or goals within the organization, and which also can allow an uncomplicated switch or swap of an employee from one employee group 115 to another employee group 115 within the organization. FIG. 17 shows information displayed in response to selection of a job titles icon 146 on the system toolbar 141, including information about an employee's job title, job code, and grade code within the organization.

Figure 19:
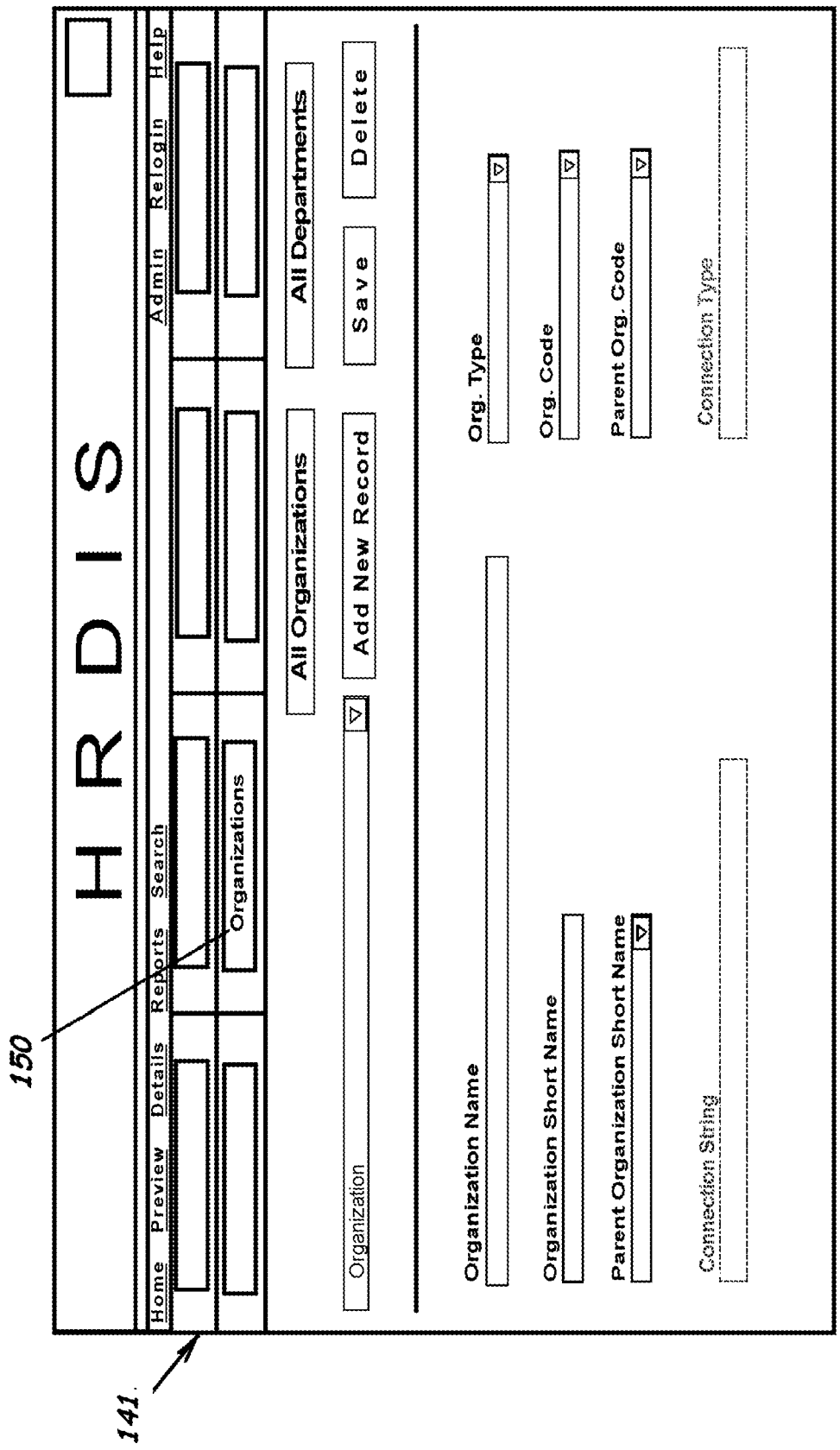
FIG. 19 is a screen view displaying information associated with an organizations icon on the system toolbar of a system to enhance human resource planning and developing according to an embodiment of the present invention.
Figure 20:
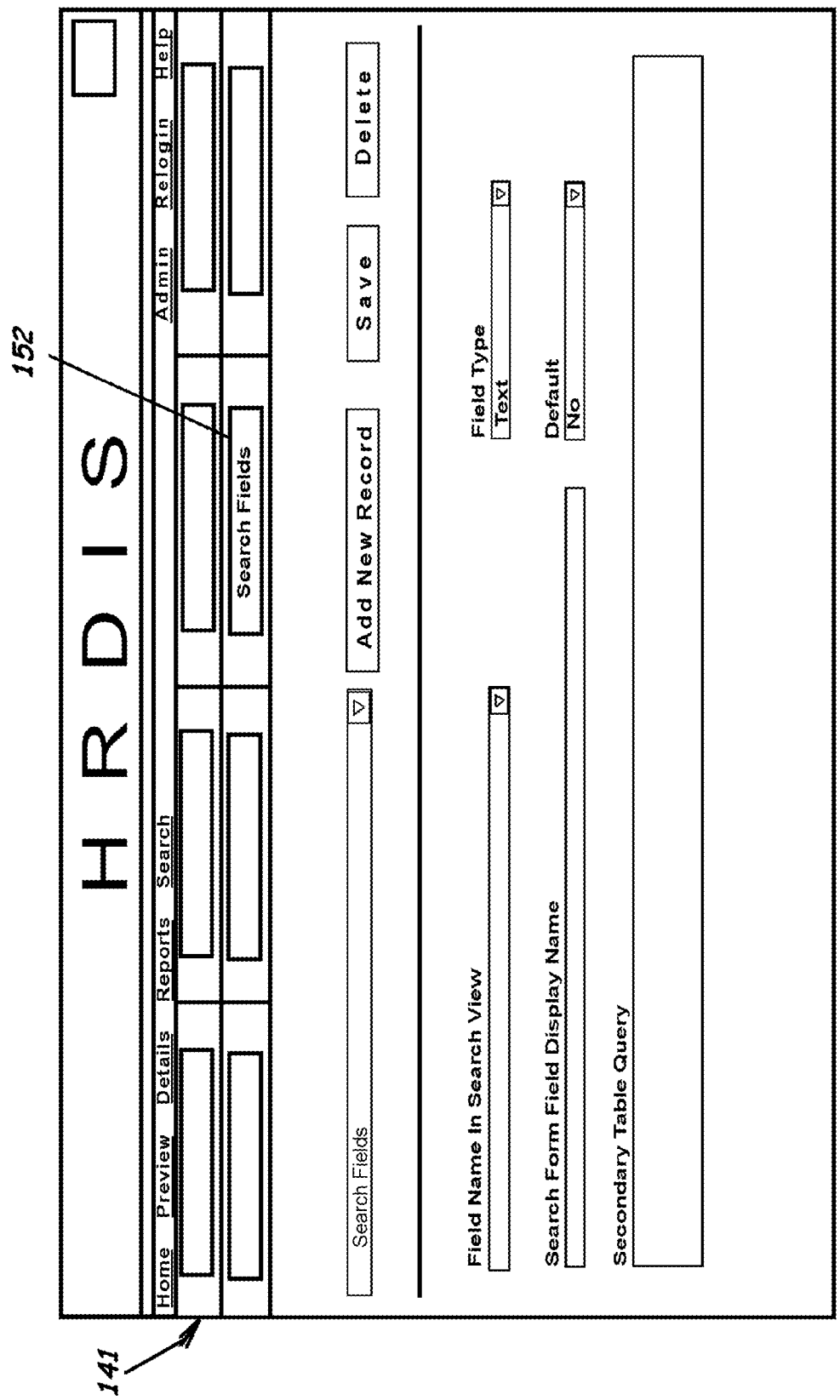
FIG. 20 is a screen view displaying information associated with a search fields icon on the system toolbar of a system to enhance human resource planning and developing according to an embodiment of the present invention.
Figure 26:
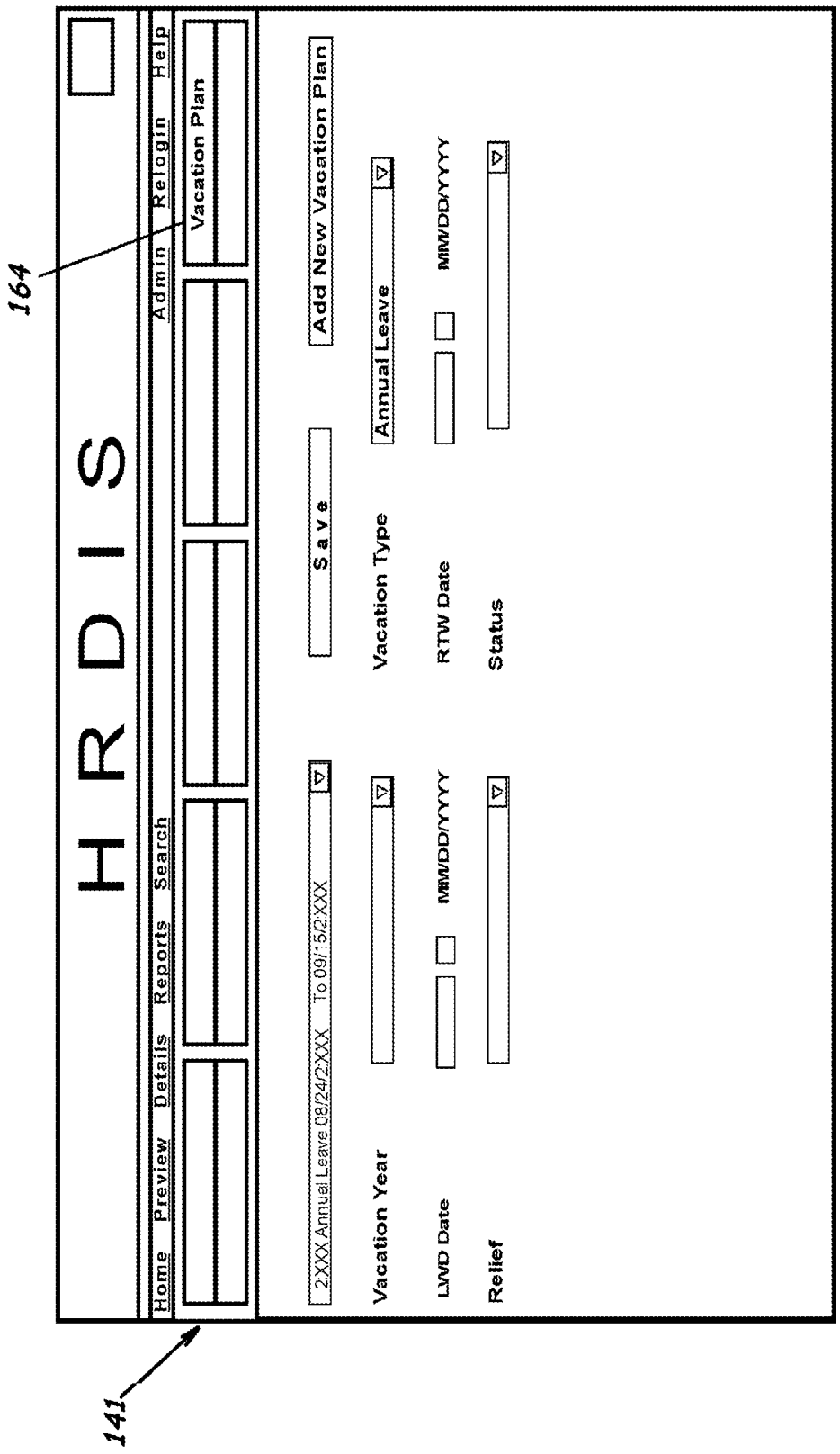
FIG. 26 is a screen view displaying information associated with a vacation plan icon on the system toolbar of a system to enhance human resource planning and developing according to an embodiment of the present invention.
Figure 32:
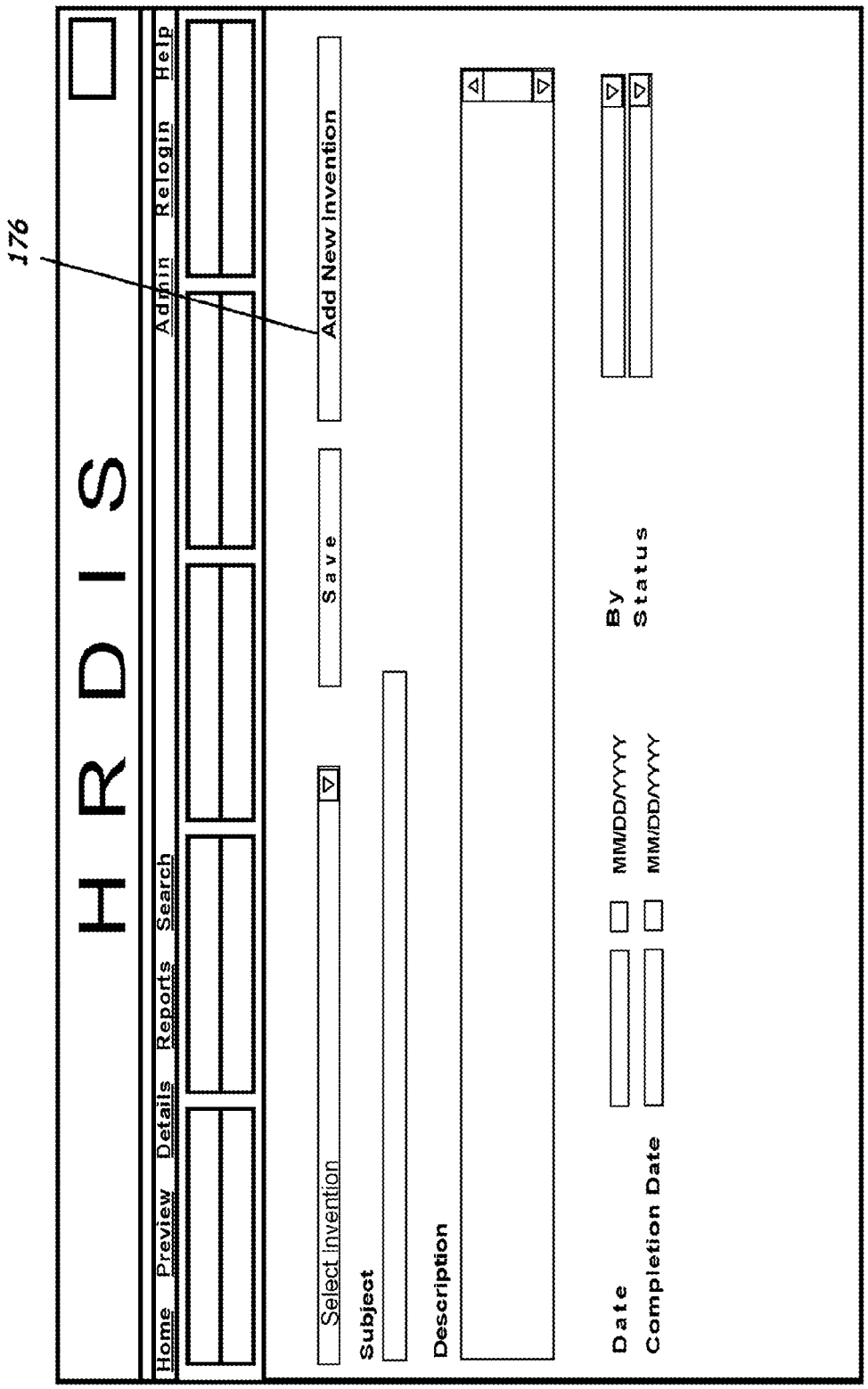
FIG. 32 is a screen view displaying information associated with an inventions icon on the system toolbar of a system to enhance human resource planning and developing according to an embodiment of the present invention.
Figure 33:
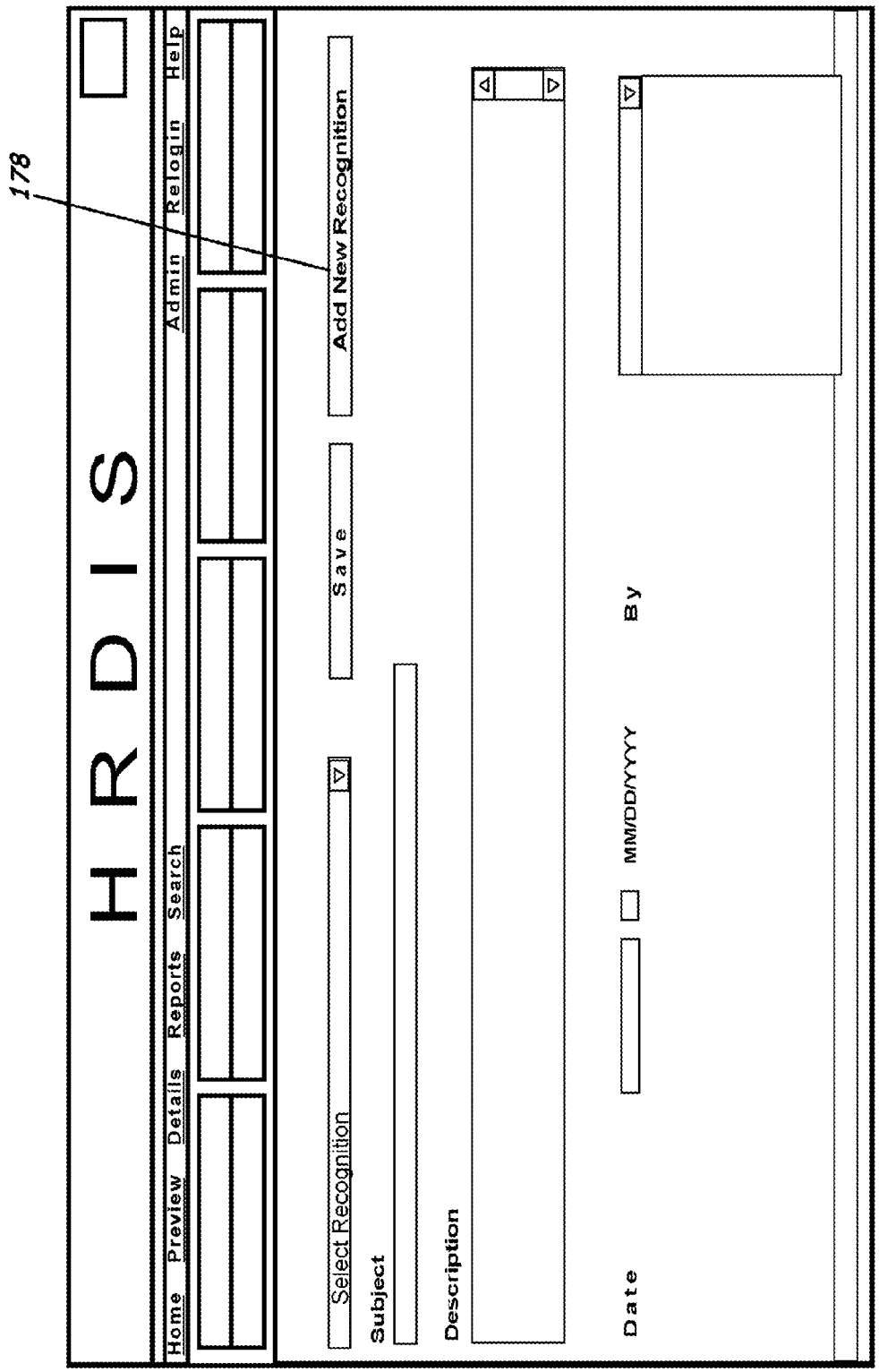
FIG. 33 is a screen view displaying information associated with a recognitions icon on the system toolbar of a system to enhance human resource planning and developing according to an embodiment of the present invention.
Figure 18:
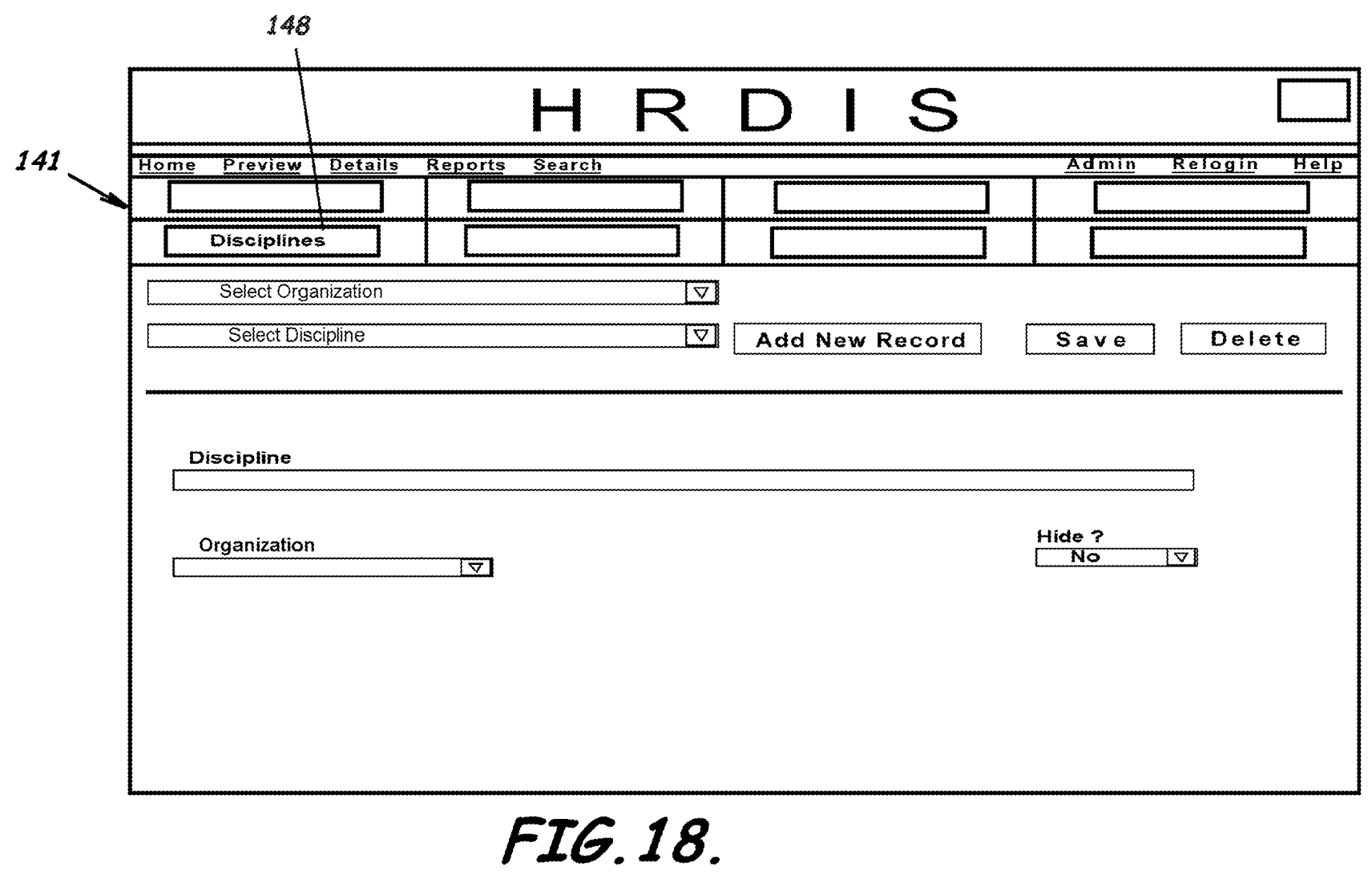

FIG. 18 shows information displayed in response to selection of a disciplines icon 148 on the system toolbar 141, including information regarding an employee's particular discipline within the organization. FIG. 19 shows information displayed in response to selection of an organizations icon 150 on the system toolbar 141, including information about the employee's department "short-name" within the company, as well as the parent department "short-name." The "short-name" may be an acronym or otherwise discernable symbolism referring to a particular department. The information can also include a connection string and connection type, if applicable. FIG. 20 shows information displayed in response to selection of a search fields icon 152 on the system toolbar 141, which enables the user to search the intranet of the organization by entering a particular field name or other query into the search boxes on the screen.

Figure 21:
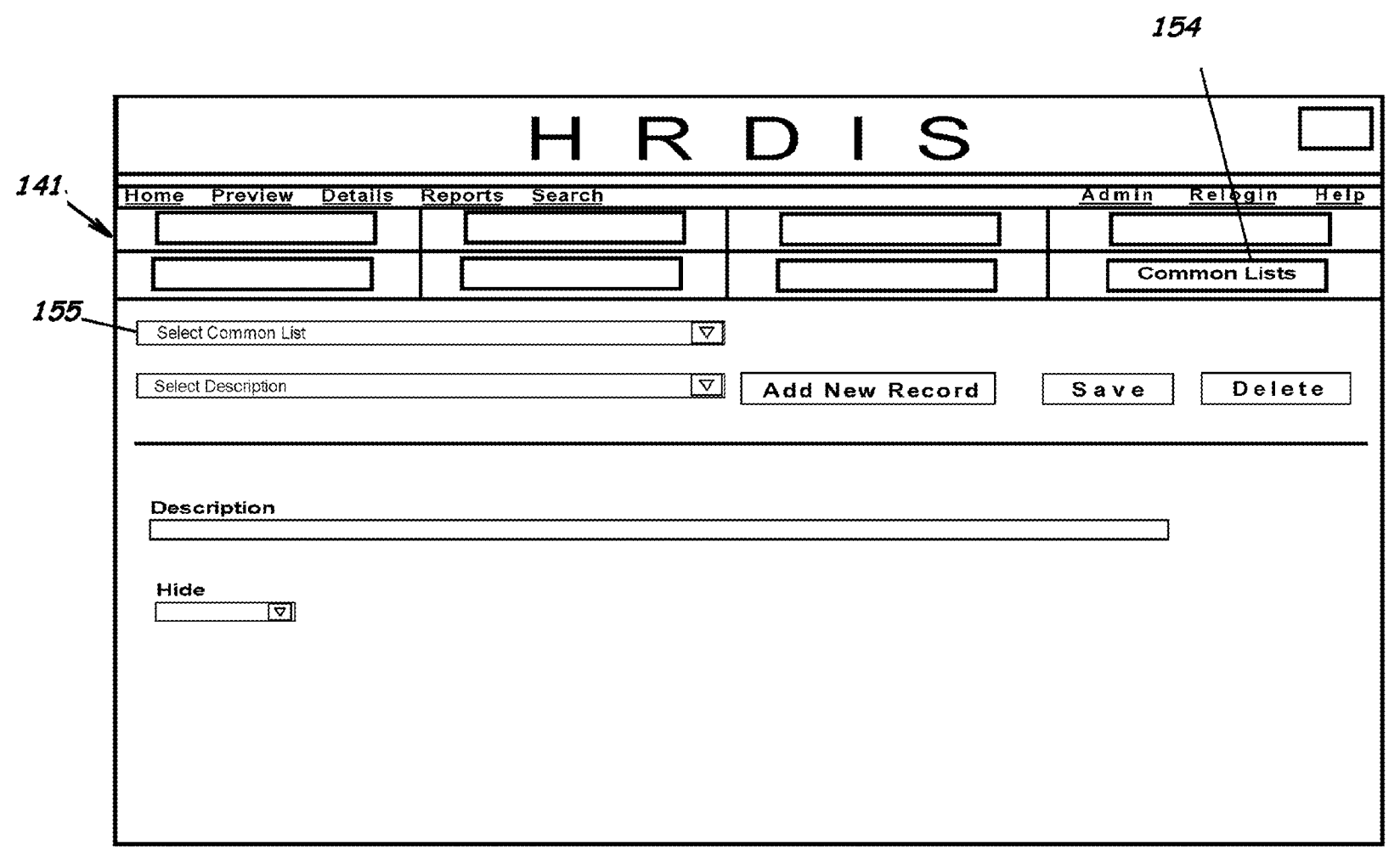

FIG. 21 shows information displayed in response to selection of a common lists icon 154 on the system toolbar 141, from which the user may select an icon from a drop-down menu to view one of several different list options. For example, the following are list options capable of being selected by the user, for example, within a common lists drop-down menu 155: assignment type, course type, education type, organization type, organization level, employee category, grade code, education sponsor, and status.

After all employee information is inputted into the HRDIS database 103, it is possible for all authorized personnel to view and analyze the employee's information, which is accessible through the website of the corporate intranet. A comprehensive security check or system preferably exists for the employee data inputted into the intranet system, and only authorized personnel arranged in an orderly personnel hierarchy are given data access to view or modify the employee's information. As shown in FIG. 1A, according to an embodiment of the present invention, every employee in any of the employee groups 115, as well as all mentors 120 and supervisors 125, can both view and modify the employee's individual development plan. The manager 130 is authorized to view, but not modify, the employee's individual development plan.

Embodiments of the system 100 can use the employee information in the database 103 to construct a ten-year manpower plan (see FIG. 42), which is a management 135 monitoring and reporting tool to create a future manning prediction for the organization. When accessing the ten-year or so manning plan, the user can perceive the manpower status of the organization for each year up to ten years into the future. The ten-year manpower plan is calculated from an algorithm that considers various pieces of information (see FIG. 6), including birth dates (for predicting retirement—see block 341), promotion intervals (see block 342), vacancy expectations (see block 343), recruitment expectations (see block 344), current performance of employees, promotion criteria (see block 345), grade potentials of employees (see block 346) and other information. The birth dates of employees are used to predict an expected date of retirement. The promotion interval is the minimum number of years between promotions, and is based on the last performance category for that employee. If there is a unique promotion plan for a particular employee, that promotion plan will override the default promotion interval in the system. The vacancy data also assists in determining employee flow control, and reports any absence of an employee assignment within an employee group 115.

According to an embodiment of the present invention, all employment numbers presented for years one through ten are year-end numbers, and can only be viewed by supervisors 125, managers 130, or other management 135 within the organization. In an embodiment of the present invention, management 135 can view the annual employment numbers for the ten-year manpower plan through one of six options: (1) with budget slots, (2) without budget slots, (3) permanent employees, (4) temporary employees, (5) contractors, or (6) all of the above (see block 340). The "all of the above" option is the default option, under which management 135 may view all categories at once.

Figure 7:
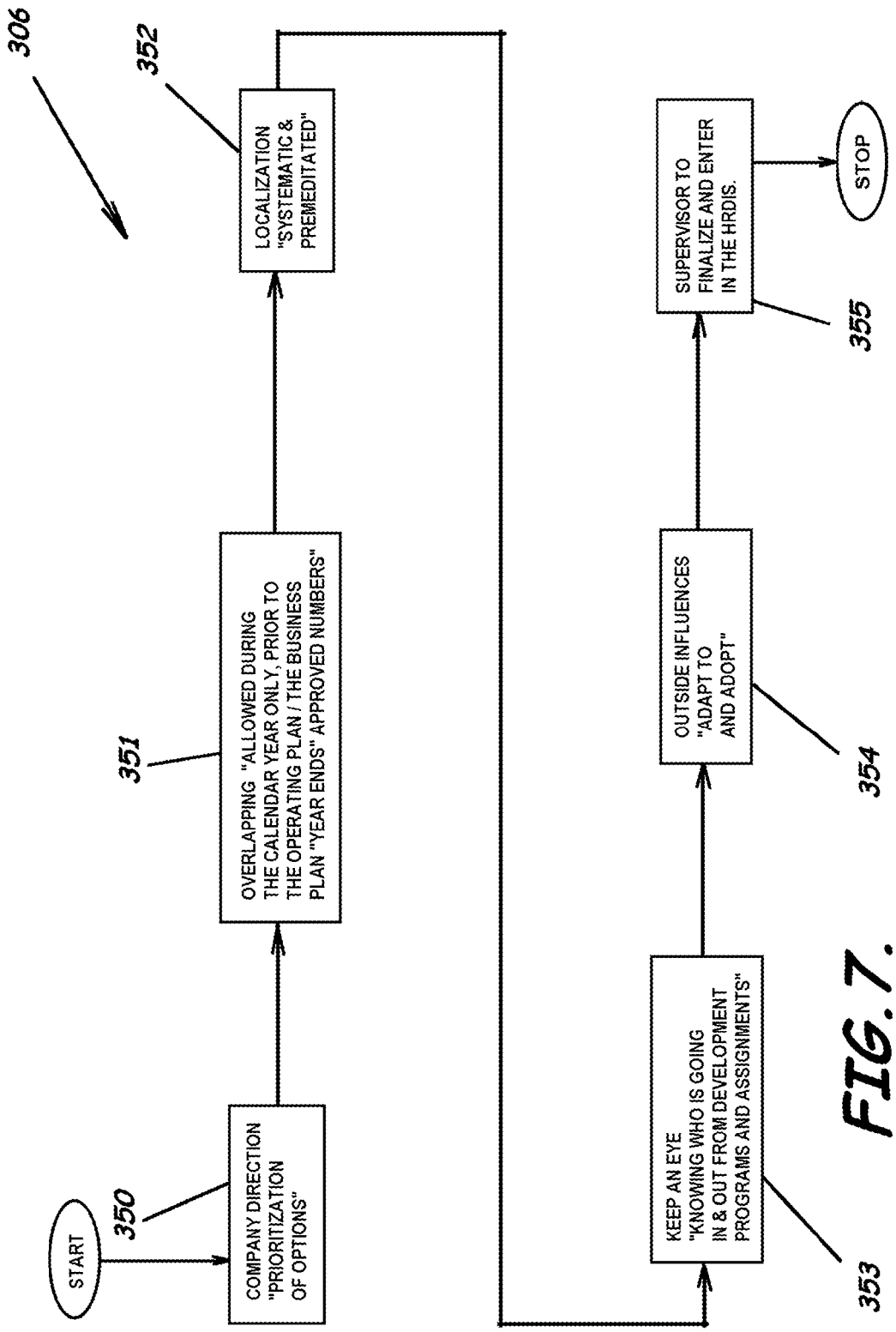
FIG. 7 is a block diagram of operations of a system to enhance human resource planning and development within an organization according to an embodiment of the present invention.

As shown in FIG. 7, embodiments of the system 100 can include an evaluation of HRDIS recruitment, and if there are any changes at any point to the recruitment data in the system, these changes are continuously fed via a feedback loop into the algorithm responsible for calculating the ten-year manning plan. This step prioritizes the recruiting options in view of the direction of the organization (see block 350). The process is systematic and premeditated and the data can be localized within the system (see block 352). For example, the system keeps a record of which recruits are entering and finishing development programs and other assignments (see block 353). This step of the process is also able to adapt to and adopt outside influences that may favorably or adversely affect recruiting (see block 354). Factors affecting the recruiting evaluation include the following: promotion expectations, internal transfer expectations, loanees or secondees, trainee exchanges, annual intakes, and the relative necessity of independent contractors versus direct hires such as permanent employees and temporary employees.

The recruiting evaluation relies upon the numbers taken from the ten-year manning plan in order to best predict the number of recruits necessary for growth of the organization from year-to-year. In addition to predicting future recruits necessary for growth of the organization, this step of the process also includes entering the number of current recruits presently employed by the organization.

Recruiting employees within the organization are considered employees for purposes of the ten-year manning plan. In some instances, the number of total employees may extend beyond the number of positions shown available in the ten-year manning plan because the number of recruits effectively inflates the total number of total employees. Additionally, if a recruit feels it would be beneficial to receive training in more than one discipline, that recruiting employee may overlap between two or more departments of the organization. Such extension and overlapping of employee numbers, although deviating from the actual number of employees promulgated in the ten-year manning plan, is allowable throughout the length of the calendar year (see block 351). At the end of the calendar year, however, a precise count of "year-end" employee numbers, approved by management 135, are required for a consistent and accurate manning prediction for the ten-year manpower plan. Therefore, no extension or overlapping of numbers for recruits is permissible at the end of the calendar year when establishing "year-end" employee numbers.

Accordingly, only those recruits who have unequivocally accepted offers for employment within a particular department of the organization will be included in the "year-end" employee numbers utilized in the ten-year manning plan. The department supervisor 125 for the employee group 115 in which the recruits are positioned is responsible for finalizing the "year-end" employee numbers and entering them into the HRDIS system (see block 355).

Although most of the recruiting employees are not included in the "year-end" employee numbers for the organization, data relating to the full and comprehensive number of recruits throughout the organization plays an important role in the ten-year manning plan. Because at least some of the recruits will eventually join the organization as full-time employees, the number of recruiting employees at any point in time is an important element included in the algorithm for calculating the employee predictions for the ten-year manning plan. For this reason, if there are any changes to the recruiting data at any point in time, the recruiting data established from this recruiting step of the process is continuously fed via a feedback loop into the algorithm responsible for calculating the ten-year manning plan.

Figure 8:
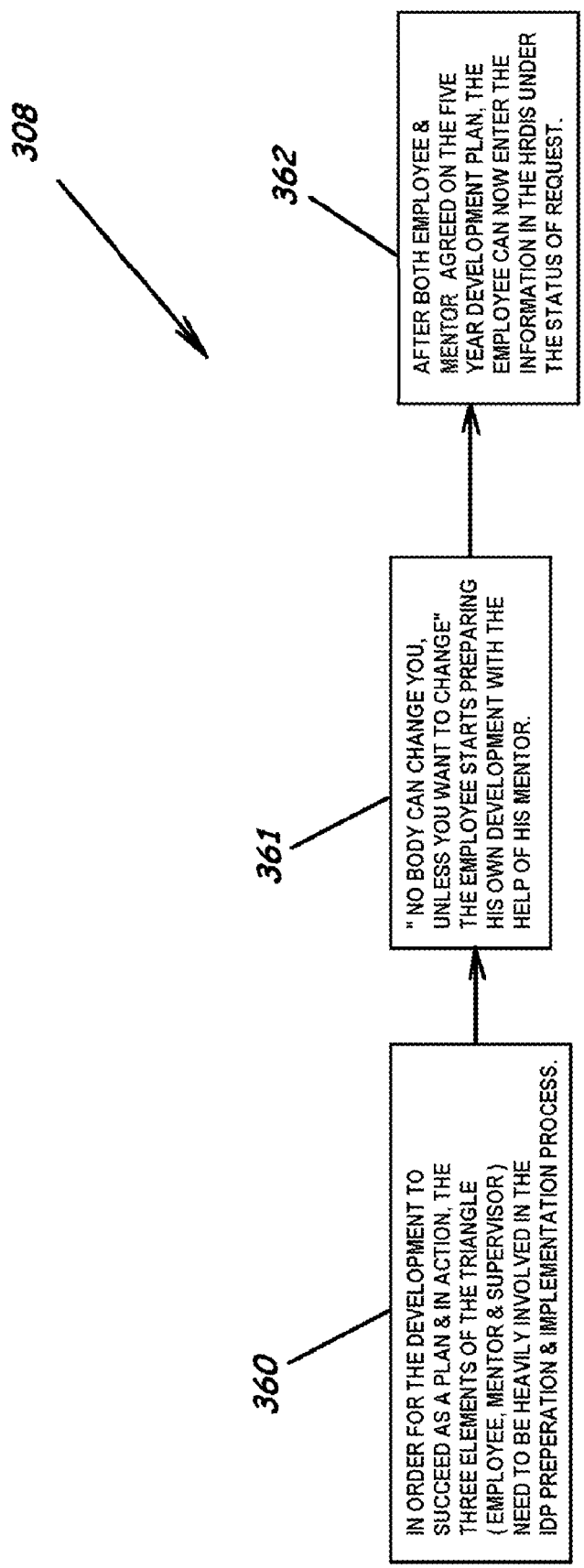
FIG. 8 is a block diagram of operations of a system to enhance human resource planning and development within an organization according to an embodiment of the present invention.

After the ten-year manning plan is operational, management 135 constructs a five-year individual development plan (IDP) for each employee in the organization (see FIG. 8). In order for the five-year training and development plan to succeed as an effective plan, it is generally necessary for all employees in the employee group 115, the mentor 120, and the supervisor 125 for each unit 110 to be heavily involved in the preparation and implementation of the training and development plan and the activities resulting therefrom (see block 360). Each employee typically prepares a substantial portion of the training and development plan, with assistance from his mentor 120 (see block 361).

The training and development plan, as well as the resultant activities, generally focuses on core competencies of the industry, personal aspirations of the individual employee, and business needs of the organization. The training and development activities utilized for the five-year plan can include, for example, the following: assignments, tasks, courses, seminars, conferences, workshops, self-development activities, presentations, participation in technical meetings, writing technical papers, advanced educational degrees, special certificates of educational achievement, educational refund programs, internship assignments, recognitions or awards, inventions or innovations conceived by the employee, time and dedication to employee self-development, memberships with societies, subscriptions with journals, membership in or on a committee, and any relevant vacation time information such as information to capture the name of the relief or relieving personnel. Other activities may be added when necessary, and activities may be deleted from the development plan when no longer beneficial.

Figure 24:
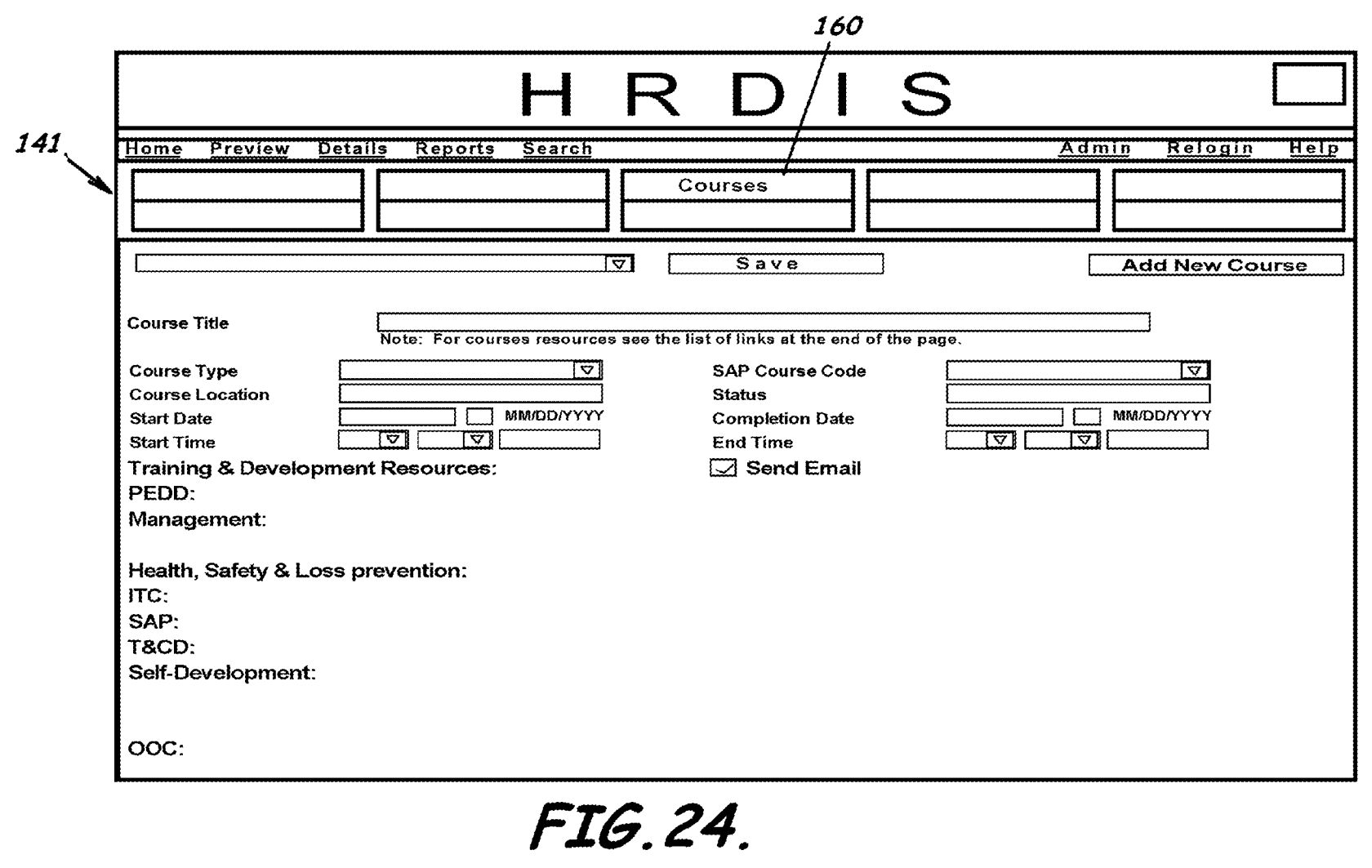
Figure 25:
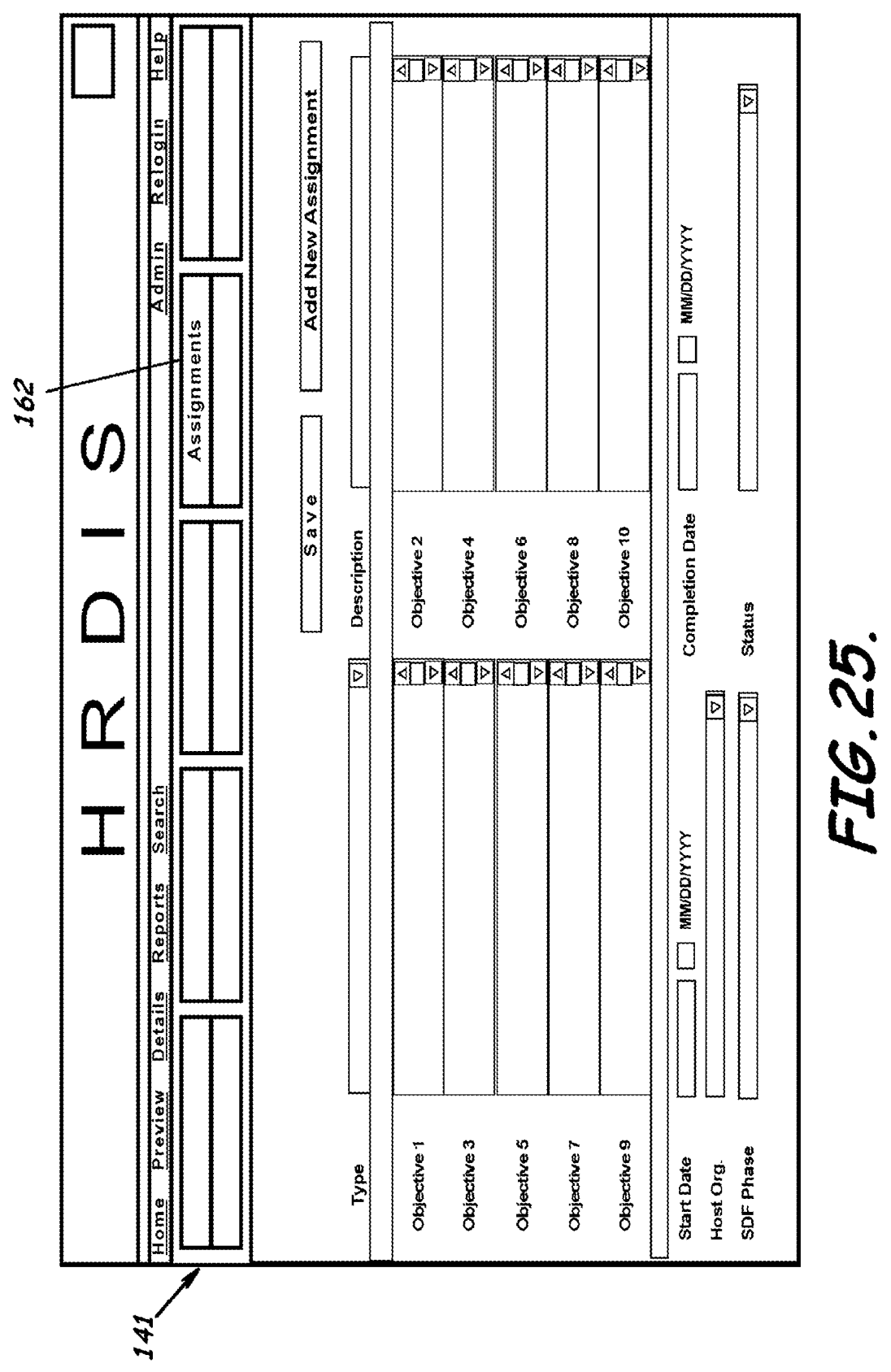

For example, FIG. 22 shows information displayed in response to selection of an employee information icon 156 on the system toolbar 141, which can include personal profile information unique to that individual. FIG. 23 shows data displayed in response to selection of an education icon 158 on the system toolbar 141, which can include degrees, majors, and grade point average. FIG. 24 shows data displayed in response to selection of a courses icon 160 on the system toolbar 141, which can include selected training and developmental courses that the employee has taken during his time with the organization. FIG. 25 shows data displayed in response to selection of an assignments icon 162 on the system toolbar 141, which can include selected training and developmental assignments and objectives completed during employment with the organization.

Also, for example, FIGS. 26, 27, 28, 29, 30, 31, 32, and 33 depict screens detailing information regarding vacation plan relief (icon 164), innovations (icon 166), presentations delivered (icon 168), workshops facilitated (icon 170), participation in technical meetings (icon 172), technical papers written (icon 174), inventions (icon 176), and recognitions (icon 178), respectively.

After both the employee and mentor 120 agree on a five-year development plan, the employee enters the agreed upon resultant data into the HRDIS system 100 under the status of REQUESTED (see block 362). The REQUESTED status-indicator generally means that the information has been forwarded to the supervisor 125 for review and approval. Accordingly, in this regard, the information maintains the temporary status of REQUESTED unless and until summarily reviewed and pre-approved by the supervisor 125 (see FIG. 9).

Figure 34A:
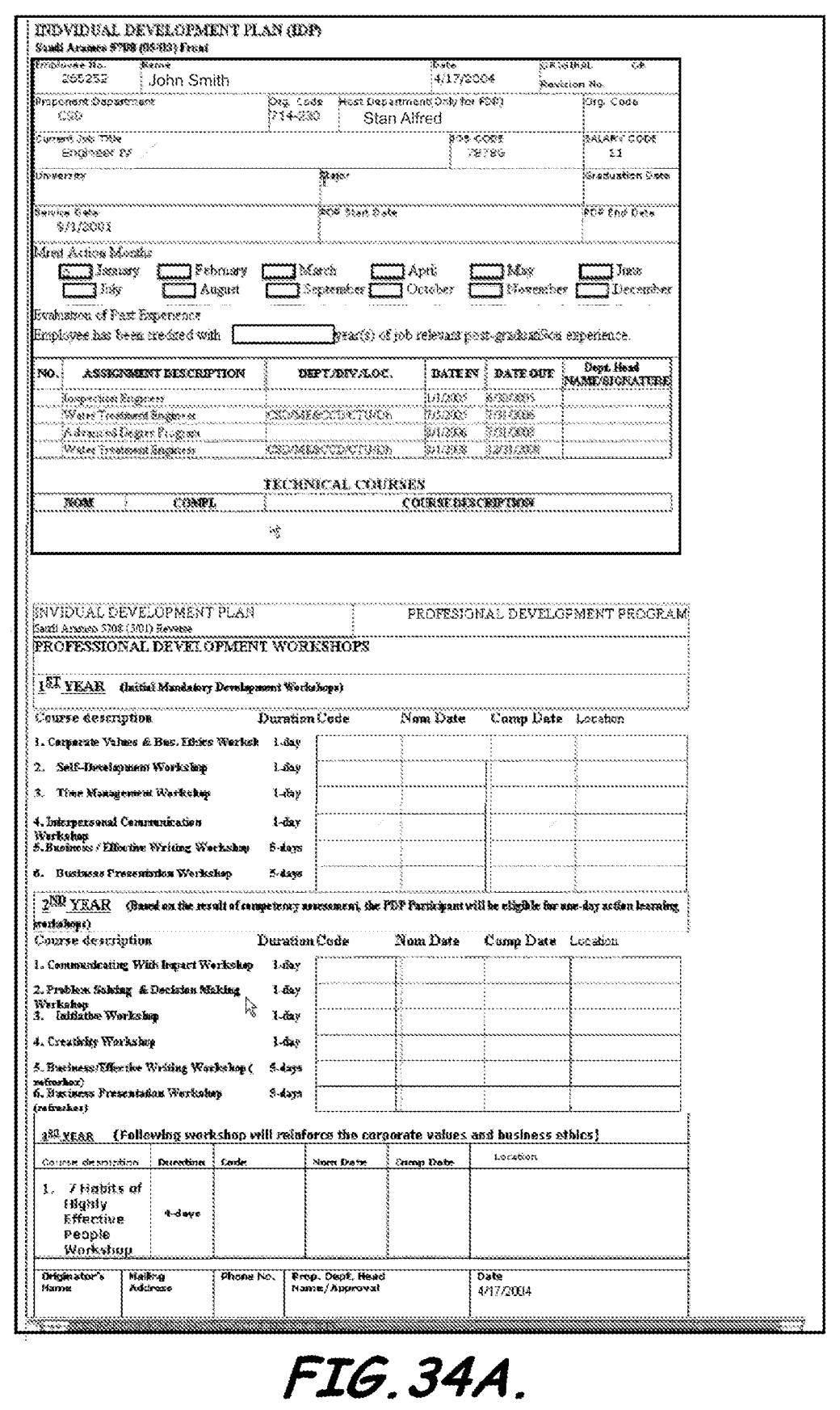
Figure 34C:
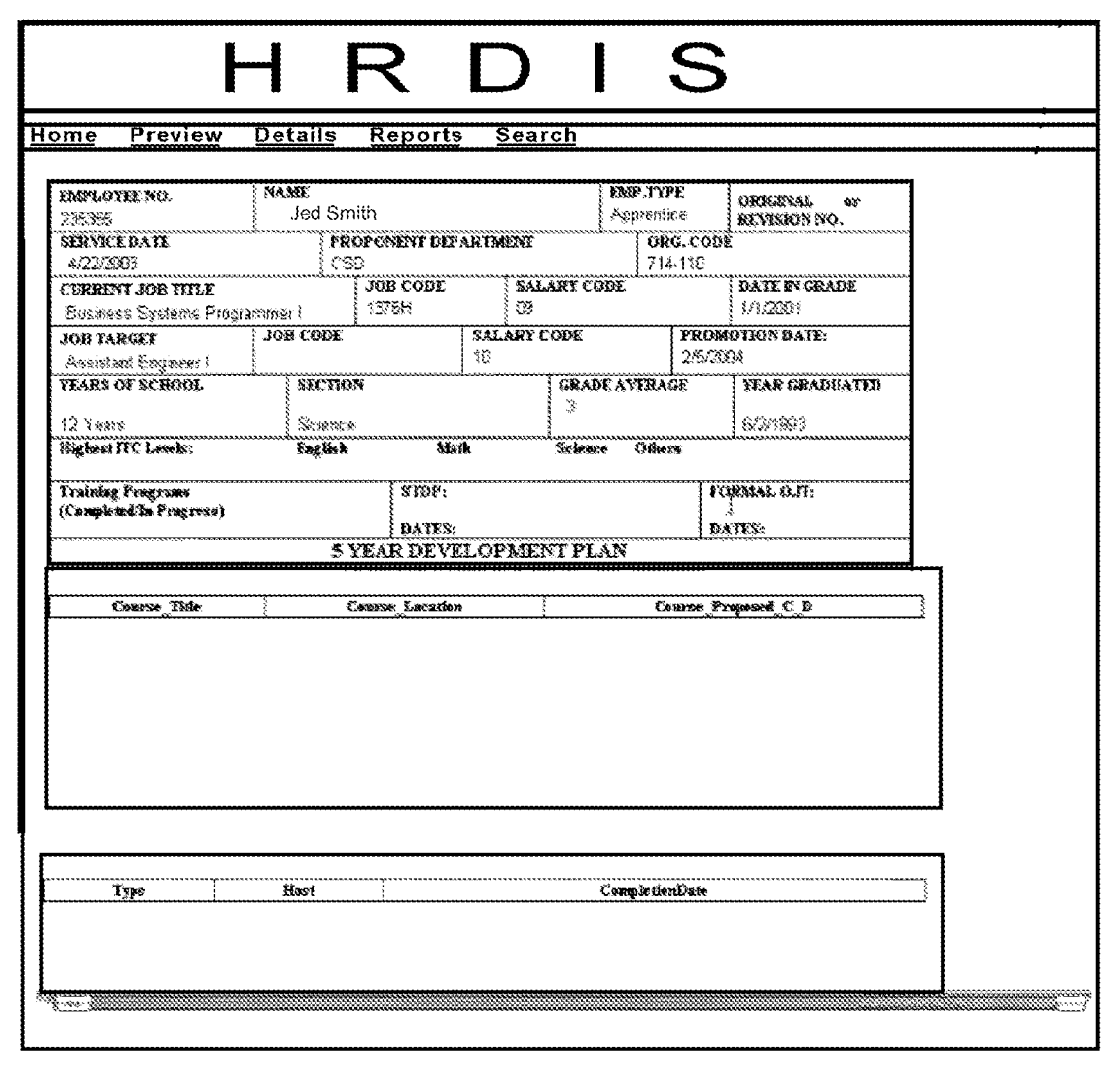

FIGS. 34A-C show exemplary personal development and five-year personal development plans having a selected format for an individual employee, although the plans can alternatively be longer or shorter as desired. For example, each year of the five-year plan includes recommended courses that the employee will undertake, as well as the duration for each instructional course. According to an embodiment of the present invention, the plans can be selected through a reports web page such as that illustrated in FIG. 41.

Figure 9:
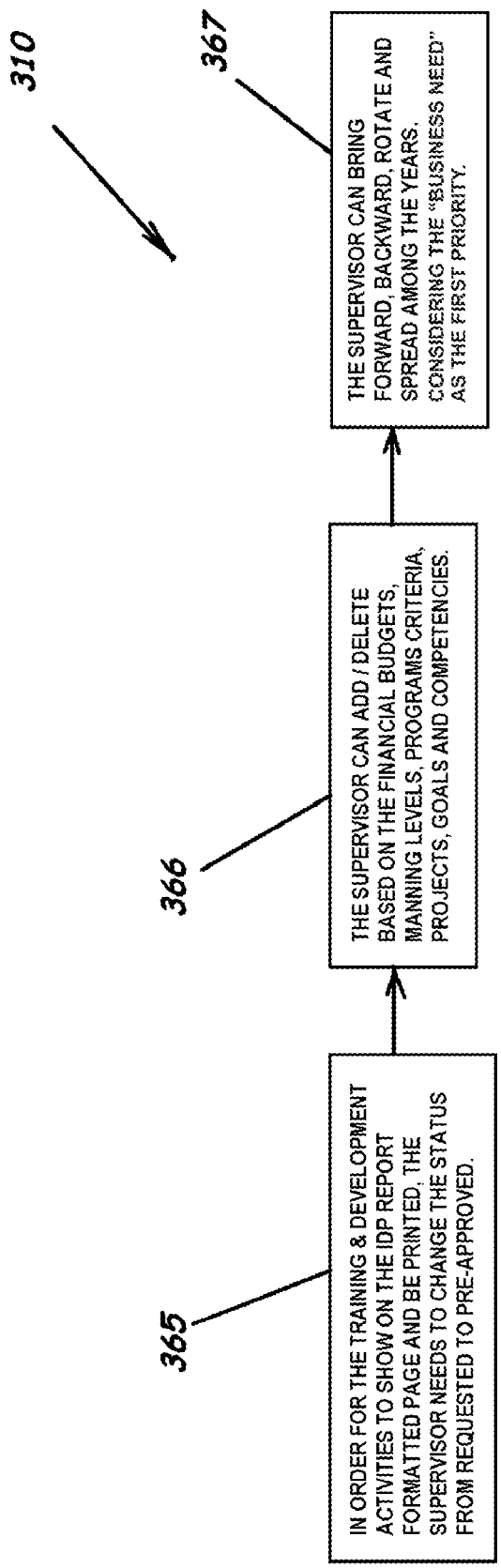
FIG. 9 is a block diagram of operations of a system to enhance human resource planning and development within an organization according to an embodiment of the present invention.

As illustrated in FIG. 9, in order for the training and development activities to show on the IDP report formatted page and be printed, it is necessary for the supervisor 125 to change the status from REQUESTED to PRE-APPROVED (see block 365). In doing so, the supervisor 125 can add and/or delete any information based upon the financial budgets, employee manning numbers, programs criteria, existing projects available, organizational goals, and core competencies of the organization (see block 366). All factors considered, the supervisor 125 typically regards the business needs of the organization to be the first priority (see block 367).

Figure 35:
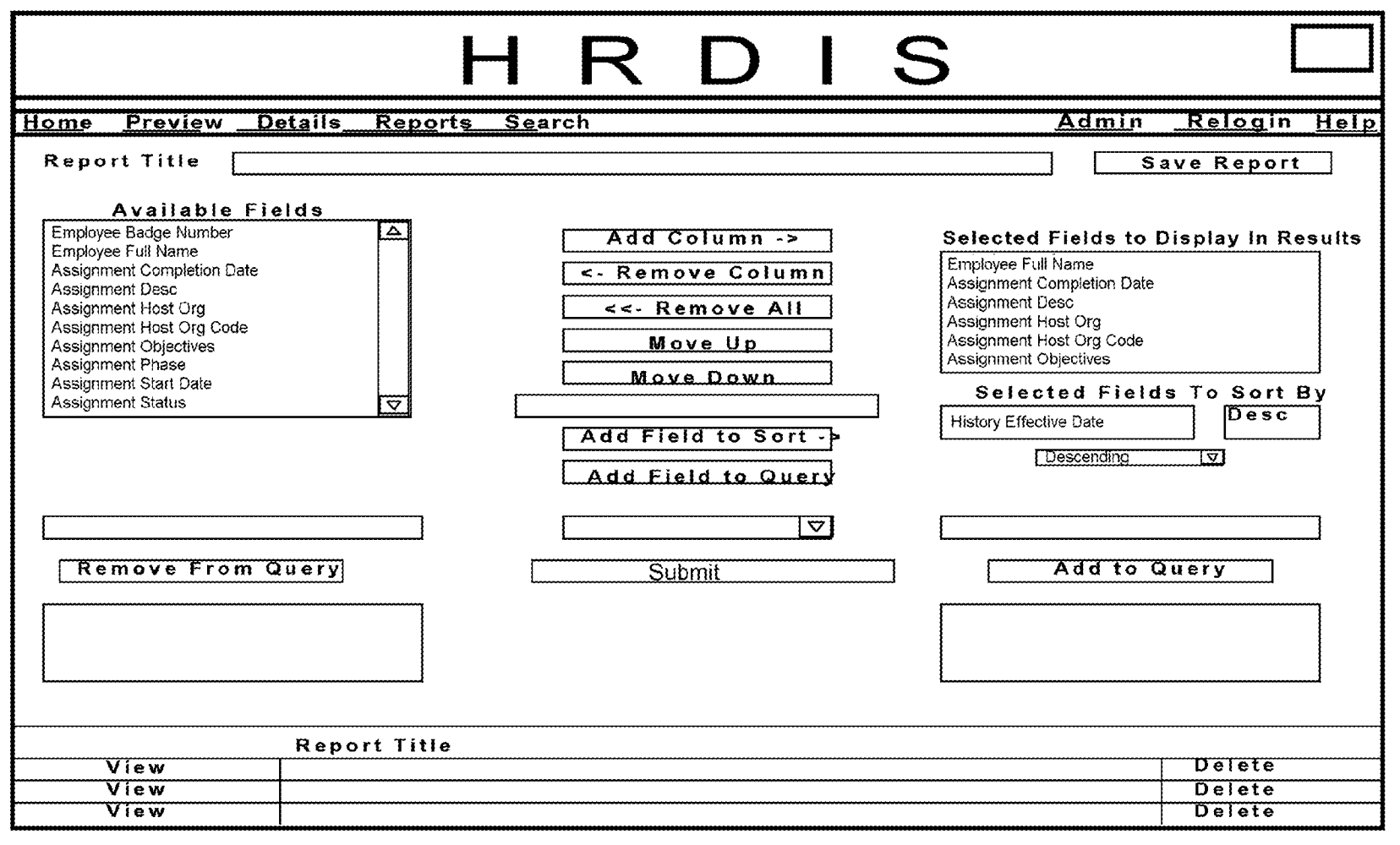

FIG. 35, for example, demonstrates the ability to add and/or remove data fields from an employee's information database. After adding or removing data fields from the database 103, the user can save the changes to permanently change the nature of the employee information displayed in the system.

The supervisor 125 may amend or modify the activities as needed, by bringing forward, carrying backward, rotating between, and spreading among the activities relative to the months or years included in the five-year training and development plan (see block 367). After reviewing and approving the five-year plan, the supervisor 125 finally changes the status from REQUESTED to PRE-APPROVED. Supervisors 125 may receive activity requests up to three or four times per year, which illustrates the benefit of a centralized human resource system. If the particular employee group 115 experiences supervisory changes leading to several supervisors 125 overseeing a single employee group 115 in any given year, the subsequent replacement supervisors 125 can easily and expediently access the previous supervisor's 125 decisions and activity approvals for each employee simply by examining the database on the organization's intranet.

Figure 10:
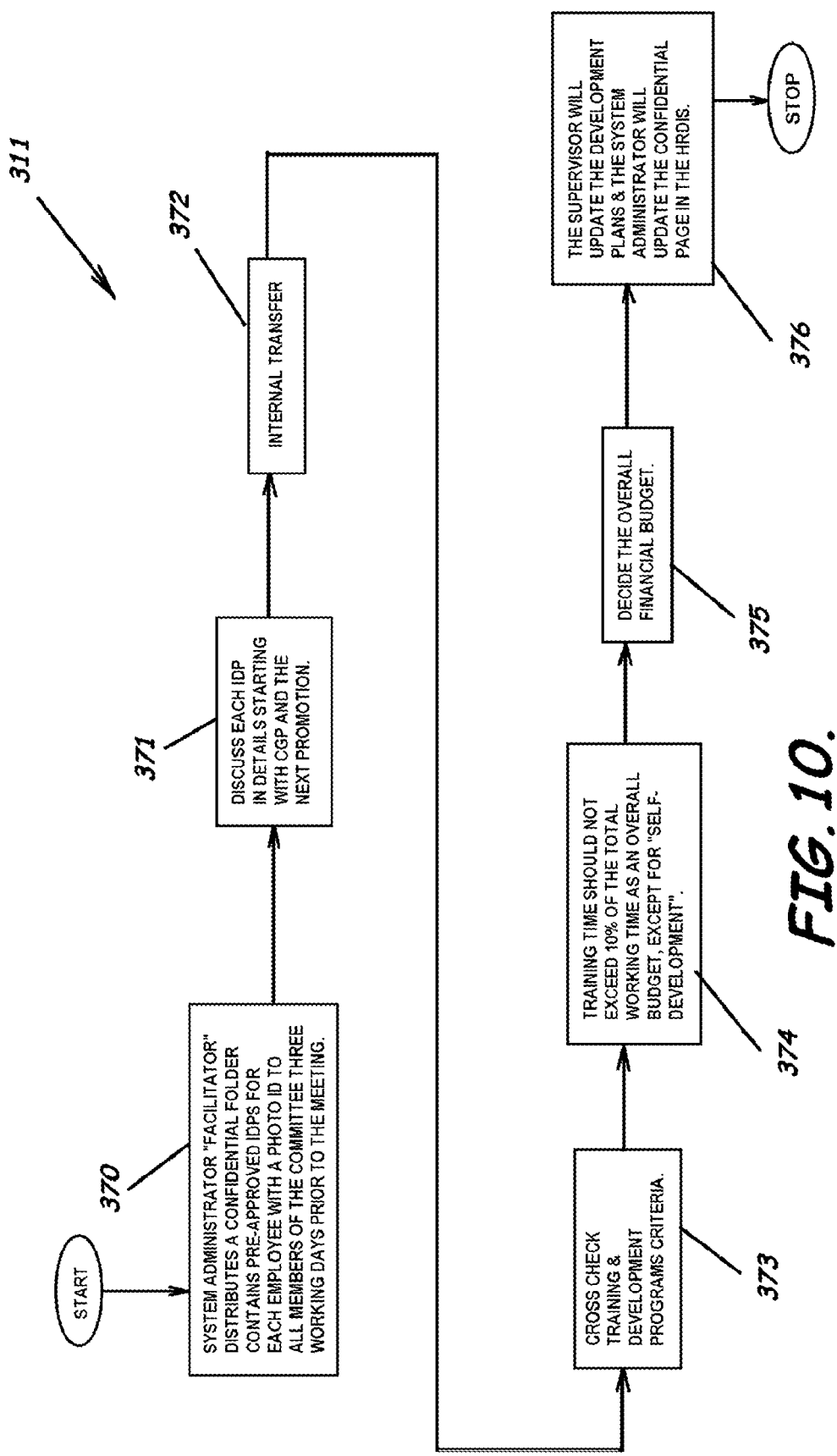
FIG. 10 is a block diagram of operations of a system to enhance human resource planning and development within an organization according to an embodiment of the present invention.

As shown in FIG. 10, the supervisor 125 completes a confidential folder containing the PRE-APPROVED training and development plans for each employee, including a photo identification of the employee, and other information (see block 370). The system administrator 102 distributes the confidential folder to all members of the management committee 135 approximately three working days prior to the management staff discussion meeting (see block 311), so that each management personnel 135 can review the folder prior to the meeting.

During the management staff discussion meeting, the manager 130 and other management personnel 135 discuss each employee's training and development plan in detail (see block 371). Management 135 collectively discusses the current growth and future potential of the employee, possibilities of internal transfer of the employee within the organization (see block 372), the next promotion for the employee, and other pertinent subjects or topics. The managers also cross-check the criteria used to evaluate the training and development programs, in order to improve the process for the future (see block 373). If there are any changes resulting from the staff discussion meeting, the resultant information from the staff discussion meetings are fed via a feedback loop into the algorithm responsible for calculating the ten-year manning plan.

Additionally, during the staff discussion meeting, management 135 reviews the activities to ensure that training and development time accounts for approximately 10% of the total working time of the employee in the overall budget (see block 374). The only general exception to this percentage approximation is time spent on self-development, which is generally encouraged by the organization. After reviewing the training and development activities for all employees, management 135 determines an overall financial budget for the next calendar year, as well as for the duration of the five-year training and development plan (see block 375). Finally, the supervisor 125 updates the training and development plans to reflect the sentiments of management 135 during the staff discussion meeting, and the system administrator updates the confidential web pages within the HRDIS system (see block 376).

Figure 11:
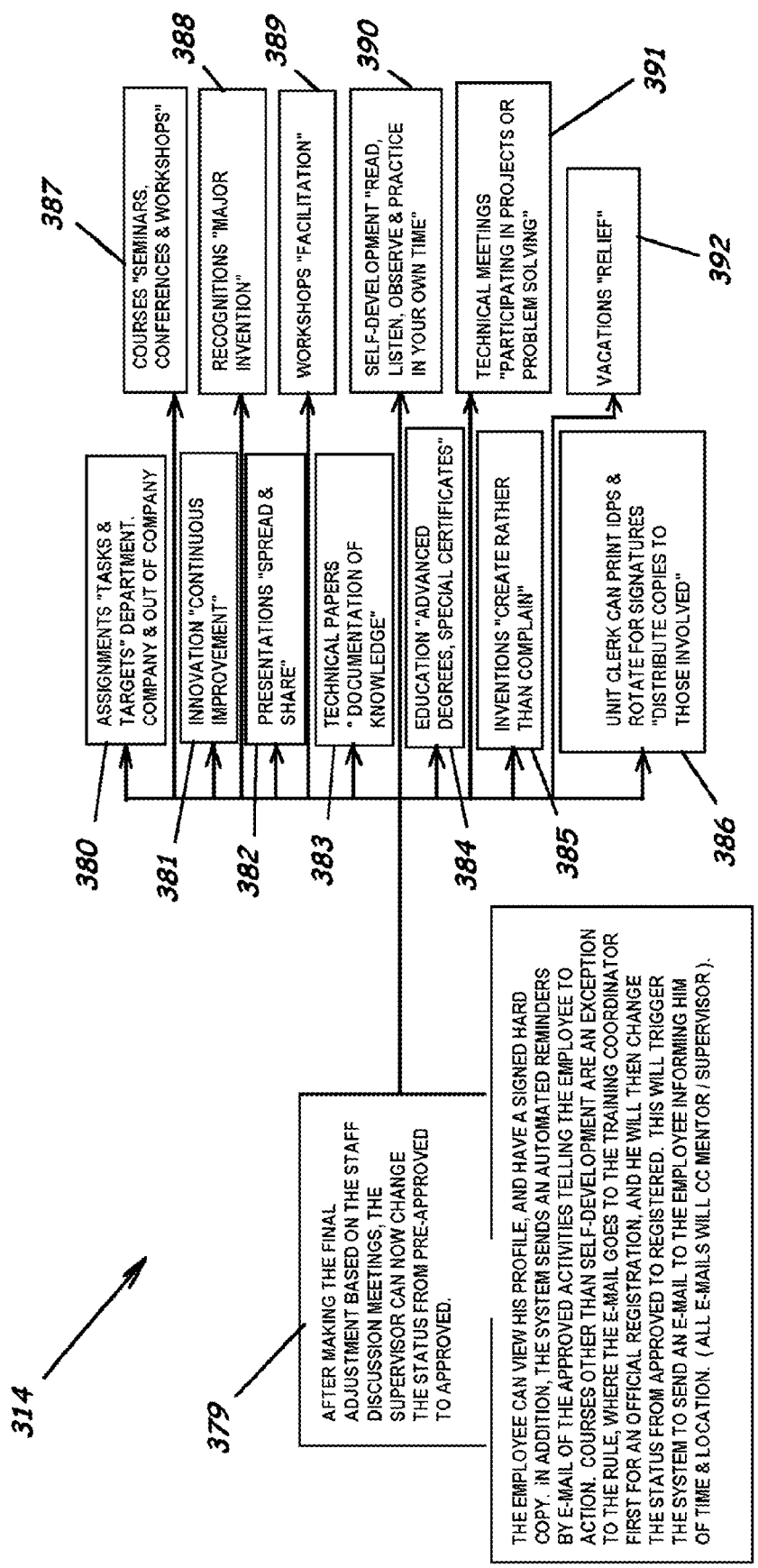
FIG. 11 is a block diagram of operations of a system to enhance human resource planning and development within an organization according to an embodiment of the present invention.

As shown in FIG. 11, after the aforementioned steps are effectuated, and after the final adjustments are made to the training and development plan based on the management 135 staff discussion meetings, the supervisor 125 amends or modifies the status from PRE-APPROVED to APPROVED (see block 379), in order to finalize the employee's individual development plan (see block 314). Copies of the training and development plan can be printed and distributed to those involved (see block 386). Further, the data from the finalized APPROVED employee individual development plan can be fed via a feedback loop into the algorithm responsible for calculating the ten-year manning plan.

The employee may view his profile and his five-year individual training and development plan on a web-page accessible through the intranet of the organization. The organization also typically provides the employee with a signed hardcopy of the profile and five-year plan. Additionally, the system 100 can send an automated reminder, e.g., e-mail, to the employee of the approved training and development activities, and calls the employee to immediate action on the activities. All e-mails sent to the employee typically are also copied to the employee's mentor 120 and supervisor 125 (see block 379).

Figure 12:
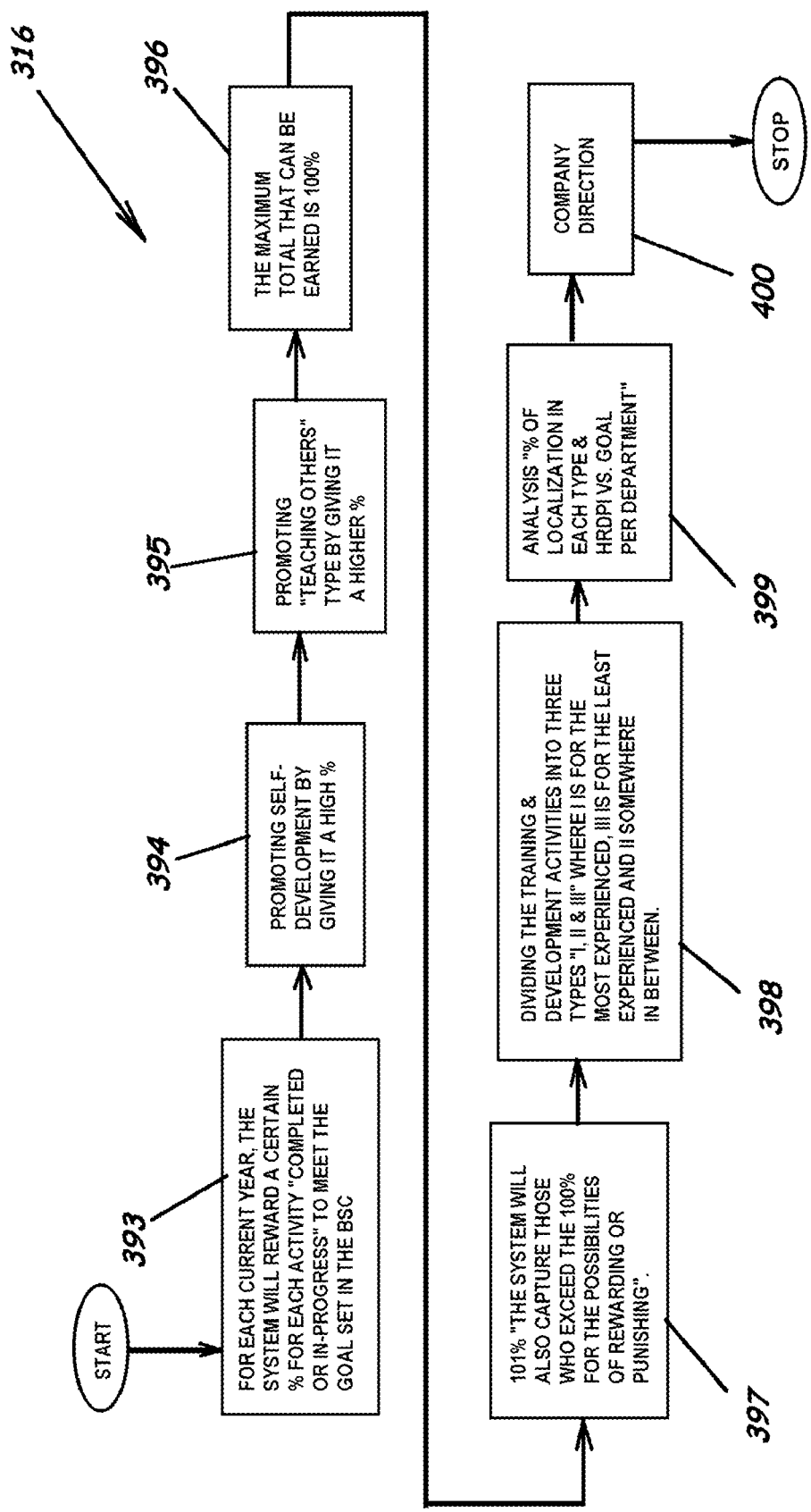
FIG. 12 is a block diagram of operations of a system to enhance human resource planning and development within an organization according to an embodiment of the present invention.

As shown in FIG. 12, during each year, as part of the process of analyzing the system information, the system will record whether an activity is "completed" or "in-progress" (see block 393). The system will reward a certain number of points toward the employee's stated goals when an activity has been "completed" or is "in-progress." The system typically also promotes activities of "self-development" and activities involving "teaching others" by giving them a high number of points (see blocks 394 and 395). Although technically it is possible to exceed 100 points by performing an excessive number of activities, the organization typically will only recognize a maximum of 100 points earned (see block 396). Nevertheless, the system 100 can capture those who exceed 100 points for the possibility of rewarding or punishing such achievement (block 397).

FIG. 36 shows an exemplary performance indicator for an employee. As further shown in FIG. 11, the performance indicator can be calculated from an algorithm based upon the self-development (see block 390), education (see block 384), courses (see block 387), assignments (see block 380), innovations (see block 381), inventions (see block 385), presentations delivered (see block 382), workshops facilitated (see block 389), participation in technical meetings (see block 391), technical papers written (see block 383), recognitions (see block 388), subscriptions to journals, membership in societies, vacation relief (see block 392), and other employee information taken during employment with the organization.

Additionally, the system 100 can keep a historical record of the major profile changes for each employee, as well as historical promotion data. FIG. 37 demonstrates the ability to archive historical data within the system 100 for evaluation and analysis. The historical archive can display an employee's development and progress through the organization, describing such data as the department, employee category, career discipline, and job title of the employee at any particular point in time during employment.

As further shown in FIG. 12, the finalized training and development activities are divided up into three categories. The most experienced employees are placed in category I, the intermediate-level employees are in category II, and the least experienced employees are located in category III (see block 398). The evaluation of the points for the employee activities includes a table or graph (not shown), illustrating time on the x-axis, and illustrating the employee points goal on the y-axis, and also indicating a threshold points goal on the y-axis (see block 399). After viewing the tables or graphs, the supervisor 125 may readjust the information if necessary (see block 347, FIG. 6).

Graphs may also be drawn and illustrated regarding employee localization, employee readiness, employee maturity, as well as manning prediction graphs. Analysis of these graphs assists management 135 in determining the proper direction of the organization (see block 400). Such information is fed into the algorithm responsible for creating the ten-year manning plan via a feedback loop within the system.

Figure 38:
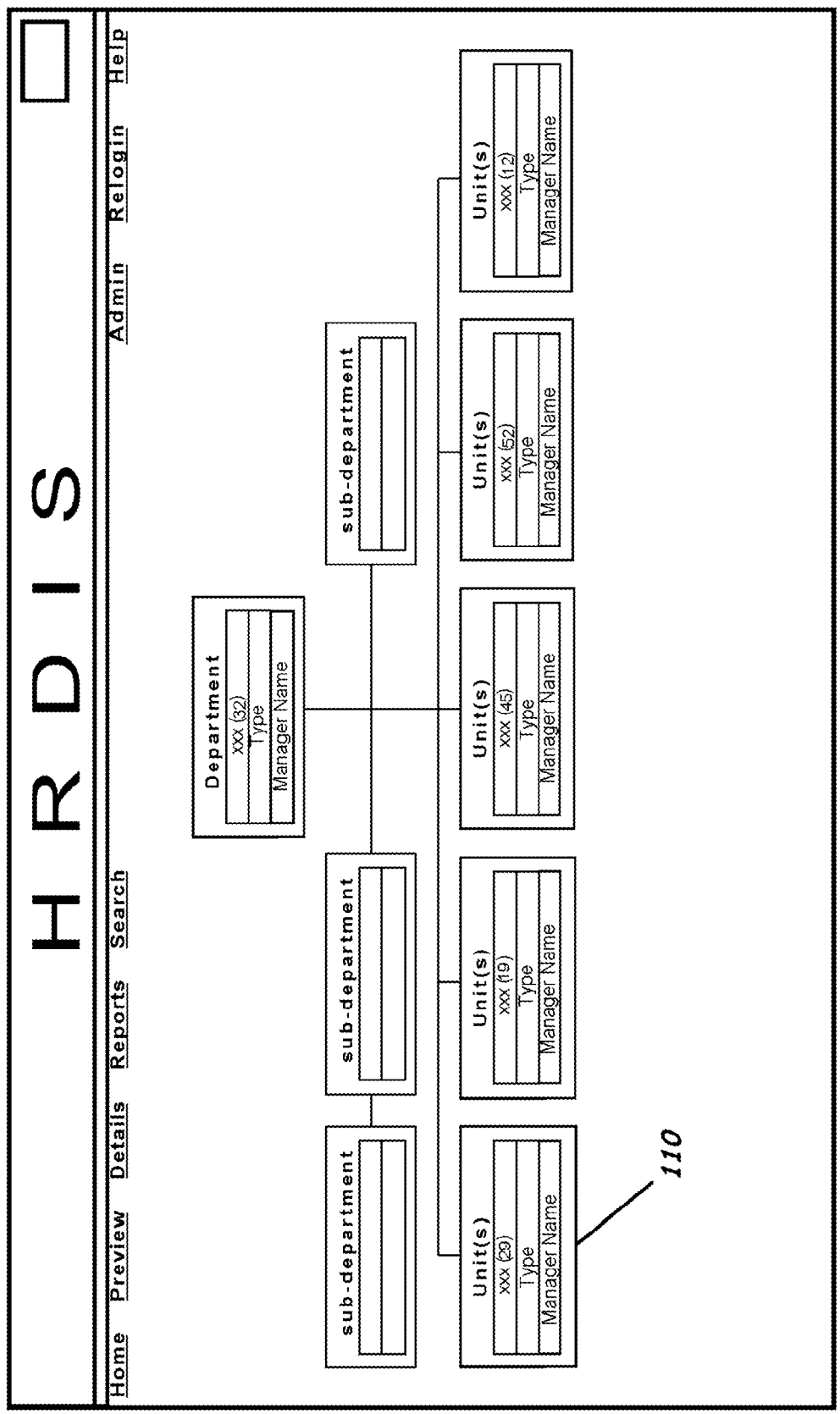
FIG. 38 is a screen view displaying a hierarchical infrastructure for a particular department of the organization according to an embodiment of the present invention.

From the homepage screen display of the organization's web-based intranet server, the user may select an icon from a drop-down menu relating to a particular department of the organization. After clicking on the desired department, the screen illustrates the infrastructure of that particular department in a hierarchical fashion, as shown in FIG. 38. The personnel hierarchy illustration shows the department, the name of the department manager 130, and the number of employees currently listed in that department, as well as any sub-units 110, including divisions, stemming from the main department.

If the user clicks on any unit 110, the screen informs the user of the total number of employees for that unit 110, and displays a list of each employee in that particular unit 110 in a format such as, for example, that shown in FIG. 39. The employee list can be arranged such that the employees are displayed in a number of rows on the screen display. The screen display feature a series of columns showing the unit name, badge number, first and last name, discipline, and job title, among other data for each employee on the list.

If the user clicks on any employee presented in the list, the screen illustrates in detail the employee's information and development within the organization, as shown in FIG. 40. Further, as described in FIG. 11, the system 100 through, for example, the web page illustrated in FIG. 40, can show details or activities such as self-development (see block 390), education (see block 384), courses (see block 387), assignments (see block 380), innovations (see block 381), inventions (see block 385), presentations delivered (see block 382), workshops facilitated (see block 389), participation in technical meetings (see block 391), technical papers written (see block 383), recognitions (see block 388), vacations (see block 392), and other employee information taken during employment with the organization. For example, the education field 180 (FIG. 40) can include a degree or other mark of distinction. The courses field 182 can include self-development courses or other appropriate courses acceptable to the organization. The assignments field 184 can include in-house assignments, and also assignments outside the employee's department.

Figure 42:
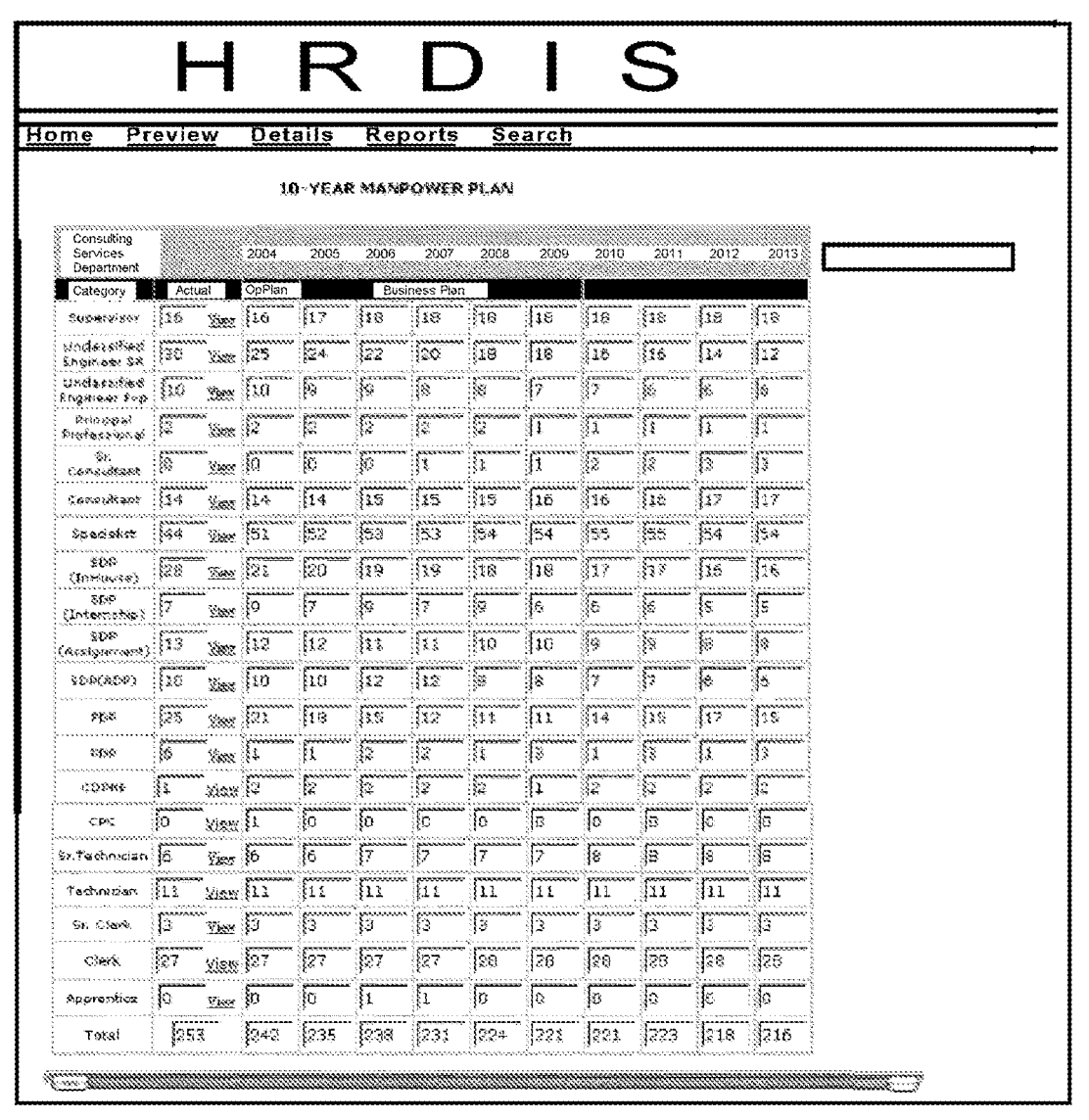

Within the web-based intranet, the user can also view the ten-year manpower plan, described previously. As shown in FIG. 42, the particular department or unit is specified vertically on the left, and the manning year is specified horizontally across the top. A number of data boxes appear where the department or unit intersects with each manning year. The number of predicted employees for a particular department in a particular manning year are displayed in the appropriate box. When viewing the ten-year manning plan, for example, the user can view and compare current employment numbers with future employment numbers, and the user can view and compare the employment predictions for each and every year within the ten-year manning plan. Additionally, according to an embodiment of the present invention, the user may at any time click on any of the data boxes containing the predicted employee number for a particular department in a particular year within the ten-year manning plan, and a detailed list and analysis of each predicted employee will appear for that department and manning year.

As illustrated in FIGS. 1-42, and as described herein, embodiments of the present invention also include a computer program product 106 embodied in a computer-readable medium 104 to enhance human resource planning for an organization. An embodiment of a computer program product 106, for example, includes human resource manning plan instructions responsive to preselected manning assumptions to process human resource information and to predict a future number of employees desired within the organization for a preselected period of time to thereby define a human resource manning plan (see block 304), and employment development plan instructions responsive to preselected employment development assumptions to process the human resource information and to assign a plurality of employment development activities to each of a plurality of participating employees in the organization to thereby define an employment development plan for each participating employee (see block 314). The computer program product 106 can also advantageously include recruitment plan instructions to process the human resource information and to create a recruitment plan (see block 306) responsive to information from the employment development plan and also responsive to preselected recruitment assumptions. The preselected recruitment assumptions, for example, can be selected from the group on employee internal transfer expectations, employee promotion expectations, permanent employee expectations, temporary employee expectations, and independent contractor expectations.

This embodiment of a computer program product 106 can further include instructions to request employment development activity data from the user to verify completion of the employment development activities, performance indicator instructions to process the employment development activity information to create a performance indicator for each employee in the organization responsive to completion of the employment development activities, and instructions to reward a number of points to the participating employee responsive to the participating employee's completion of one of the activities in the employment development plan (see block 316). The preselected employment development assumptions can be selected from the group of: core competencies of the industry, personal aspirations of the individual employee, and business needs of the organization, and the employment development activities can be selected from the group of: assignments (see block 380), tasks, courses (see block 387), seminars, conferences, workshops (see block 389), self-development activities (see block 390), presentations (see block 382), participation in technical meetings (see block 391), writing technical papers (see block 383), advanced educational degrees (see block 384), special certificates of educational achievement, educational refund programs, internship assignments, recognitions (see block 388), awards, inventions (see block 385), and innovations (see block 381) by the employee.

Embodiments of a computer program product 106 can also include instructions to provide a limited number of individuals within the organization with the right and ability to modify the employment development plan for a participating employee and a security component adapted to identify the specific user accessing the database at a particular point in time. These embodiments of a computer program product 106 of the present invention can further include instructions to implement real-time management decisions to determine the employment development activities for the participating employee, and instructions to display the employment development plan for a participating employee to a viewer through a graphical user interface. The human resource planning instruction further include instructions to access a historical record of the participating employee's development within the organization. The preselected manning assumptions can be selected from the group of: retirement expectations (see block 341), employee promotion expectations (see block 345), employee vacancy expectations (see block 343), employee performance expectations (see block 346), and recruitment expectations (see block 306).

Embodiments of a computer program product 106 still further can include instructions to assign the predicted future number of employees into a plurality of future employee groups and to associate the future number of employees within the future employee groups to a future calendar year (see block 304), instructions to implement real-time management decisions to determine the future number of employees in the human resource manning plan (see block 311). The human resource planning instructions can further include instructions to display the human resource manning plan to a viewer through a graphical user interface. The future number of employees in human resource manning plan, for example, can be permanent employees, temporary employees, and independent contractors of the organization.

As also illustrated in FIGS. 1-42 and as described herein, the present invention also provides methods to enhance human resource planning for an organization. An embodiment of a method, for example, includes requesting human resource information from a user, accessing human resource information from a database, predicting a future number of employees desired within the organization for a preselected period of time responsive to the accessed human resource information to thereby define a human resource manning plan (see block 304), assigning a plurality of employment development activities to each of a plurality of participating employees in the organization to thereby define an employment development plan for each participating employee (see block 314), revising the human resource manning plan responsive to information generated by the employment development plan (see block 304), and revising the employment development plan responsive to revisions in the human resource manning plan (see block 315).

The method can also include creating a recruitment plan responsive to information from the human resource manning plan and the employment development plan (see block 307), requesting employment development activity data from the user, and verifying completion of the employment development activities, processing the employment development activity information to thereby create a performance indicator for each employee in the organization responsive to completion of the employment development activities, rewarding a number of points to the participating employee responsive to the participating employee's completion of one of the activities in the employment development plan, and granting a limited number of individuals within the organization with the right and ability to modify the employment development plan for a participating employee and identifying the specific user accessing the database at a particular point in time. The employment development activities can be selected from the group of: assignments (see block 380), tasks, courses (see block 387), seminars, conferences, workshops (see block 389), self-development activities (see block 390), presentations (see block 382), participation in technical meetings (see block 391), writing technical papers (see block 383), advanced educational degrees see block 384), special certificates of educational achievement, educational refund programs, internship assignments, recognitions (see block 388), awards, inventions (see block 385), and innovations (see block 381) by the employee.

An embodiment of a method can further include assigning the predicted future number of employees into a plurality of future employee groups, associating the future number of employees within the future employee groups to a future calendar year (see block 304), and displaying the human resource manning plan to a viewer through a graphical user interface. The method can further include implementing real-time management decisions to determine the future number of employees in the human resource manning plan, implementing real-time management decisions to determine the employment development activities for the participating employee, displaying the employment development plan for a participating employee to a viewer through a graphical user interface, and accessing a historical record of the participating employee's development within the organization.

Yet further embodiments of the present invention provide a computer readable medium 104 that is readable by a computer such as, for example, computer 107. The computer readable medium 104, for example, includes a set of instructions that, when executed by the computer, cause the computer to perform the following operations: request human resource information from a user, access human resource information from a human resource database (see block 302), predict a future number of employees desired within an organization for a preselected period of time to thereby define a human resource manning plan (see block 304), assign a plurality of employment development activities to each of a plurality of participating employees in the organization to thereby define an employment development plan for each participating employee (see block 314), and revise the human resource manning plan responsive to information generated by the employment development plan (see block 315).

The computer readable medium 104 can also include instructions to perform the operations of requesting human resource information from a user (see block 302), accessing human resource information from a human resource database (see block 302), revising the human resource manning plan responsive to information generated by the employment development plan (see block 315), and revising the employment development plan responsive to revisions in the human resource manning plan (see block 314). The operations can further include being able to create a recruitment plan responsive to information from the human resource manning plan and the employment development plan and responsive to preselected recruitment assumptions (see block 306), and to request employment development activity data from the user to verify completion of the employment development activities, process the employment development activity information, and create a performance indicator for each employee in the organization responsive to completion of the employment development activities (see block 316). The operations can still further include being able to assign the predicted future number of employees into a plurality of future employee groups, associate the future number of employees within the future employee groups to a future calendar year, and display the human resource manning plan to a viewer through a graphical user interface (see block 304).

Still further embodiments of the present invention can include a computer memory element 104 containing stored in signal bearing media a database, the database containing the following data in computer-readable format: data indicating a community of employees of an organization accessible on a privately accessible computer network, data indicating human resource information regarding the employees of the organization, data indicating a human resource manning plan (see block 304), including data indicating a plurality of preselected manning assumptions, and data indicating an employment development plan (see blocks 310, 314), including data indicating a plurality of preselected employment development assumptions and a plurality of employment development activities. The database can also include data indicating a recruitment plan (see block 306), including data indicating a plurality of preselected recruiting assumptions. The preselected recruitment assumptions, for example, can be selected from the group of: employee internal transfer expectations, employee promotion expectations, permanent employee expectations, temporary employee expectations, and independent contractor expectations. The preselected manning assumptions, for example, can be selected from the group of: retirement expectations, employee promotion expectations, employee vacancy expectations, and employee performance expectations, and recruitment expectations. The preselected employment development assumptions can be selected from the group of: core competencies of the industry, personal aspirations of the individual employee, and business needs of the organization. The employment development activities, for example, can be selected from the group of: assignments (see block 380), tasks, courses (see block 387), seminars, conferences, workshops (see block 389), self-development activities (see block 390), presentations (see block 382), participation in technical meetings (see block 391), writing technical papers (see block 383), advanced educational degrees (see block 384), special certificates of educational achievement, educational refund programs, internship assignments, recognitions (see block 388), awards, inventions (see block 385), and innovations (see block 381) by the employee.

In an embodiment of a computer memory element 104, the database can further including data indicating a performance indicator for each of the employees in the organization responsive to completion of a plurality of employment development activities, and data indicating a historical record of development of each of the employees in the organization (see block 316).

Embodiments of the present invention include many benefits and features. For example, embodiments of a system 100 enable greater productivity and optimization of human resource development and training for all employees in the organization. Embodiments can eliminate repetitions, duplications, and paper shuffling that were responsible for substantial inefficiencies in previous systems. Embodiments can also enhance an organization's plans relating to culturization, recruitment, annual intakes, retirements, transfers within and outside of the organization, promotions, succession plans, and other benefits.

Embodiments, systems, program products, and methods of the present invention, for example, can improve the quality of training and development activities, and, in some instances, can reduce administration time and wasteful communication by up to about 70%. These embodiments can improve training prioritization and budget spending and align training and development activities with the overall business strategy of the organization. Thus, a human resource tactical administrator often is not necessary.

Such embodiments of the present invention also, for example, can analyze the employment needs of the organization for approximately ten years (see block 304), and provide an individualized development program for each employee for approximately five years (see block 314). These embodiments can take better account of each individual employee's preferred learning style and invoke group learning whenever beneficial, better identify promotable candidates, mark employment potential, and provide for greater accountability at all levels of employment.

The present application is related to U.S. patent application Ser. No. 11/334,213, now U.S. Pat. No. 7,672,861 titled "Systems, Program Products, and Methods of Human Resource Planning and Development," filed on Jan. 18, 2006, and U.S. Provisional Application No. 60/645,822, titled "Systems, Program Products, and Methods of Human Resource Planning and Development," filed on Jan. 21, 2005, each incorporated herein by reference in its entirety.

In the drawings and specification, there have been disclosed embodiments of the present invention, and although specific terms are employed, the terms are used in a descriptive sense only and not for purposes of limitation, the scope of the invention being set forth in the following claims. The invention has been described in considerable detail with specific reference to the illustrated embodiments. It will be apparent, however, that various modifications and changes can be made within the spirit and scope of the invention as described in the foregoing specification.

That claimed is:

1. A system to enhance multi-year human resource planning for an organization, the system comprising:

a first computer defining a server having at least one processor and memory operably coupled to the at least one processor, the first computer interfaced with a communication network to communicate with a plurality of client computers each also interfaced with the communication network and each configured to interface with a separate one of a plurality of users, each of the plurality of client computers being remote from and in communication with the server through the communication network; and human resource planning program code stored in the memory of the server, the program code comprising instructions that when executed by the server, cause the server to perform the following operations:

responsive to preselected manning assumptions, predicting a future number of employees desired within the organization for a preselected period of time to thereby define an organization-level human resource manning plan for the organization, responsive to preselected employment development assumptions, assigning a plurality of employment development activities to each of a plurality of participating employees in the organization to thereby define an employee-level employment development plan for each participating employee, forming an organization-level recruitment plan for the organization responsive to preselected recruitment assumptions and responsive to information from the human resource manning plan, providing a plurality of feedback pathways so that revisions in one of the at least one of the employment development plans, the recruitment plan, and the human resource manning plan, are accounted for in each other of the at least one of the employment development plans, the recruitment plan, and the human resource manning plan, the plurality of feedback pathways comprising:

a first feedback pathway comprising:

revising the organization-level human resource manning plan responsive to revisions in the organization-level recruitment plan;

a second feedback pathway comprising:
  revising the organization-level human resource manning plan responsive to revisions in at least one of the employee-level employment development plans;
a third feedback pathway comprising:
  revising the organization-level recruitment plan responsive to revisions in the organization-level human resource manning plan, and
  revising the organization-level human resource manning plan responsive to the revisions in the organization-level recruitment plan, and
a fourth feedback pathway comprising:
  revising the organization-level recruitment plan responsive to revisions in the organization-level human resource manning plan,
  revising at least one of the employment development plans for a corresponding at least one employee responsive to the revisions in the recruitment plan, and
  revising the organization-level human resource manning plan responsive to the revisions in the at least one of the employee-level employment development plans; and
creating a performance indicator for each participating employee in the organization, the performance indicator comprising:
  a point value assigned to each separate one of a plurality of completed employment development activities identified to meet a preselected performance development goal,
  a point value assigned to each separate one of one or more in-progress employment development activities identified to meet the preselected performance development goal, and
  a total value indicating a combination of the point values assigned to each of the completed and in-progress employment development activities identified to meet the preselected performance development goal, and
assigning the respective point value or values for each separate one of the completed or in progress employment development activities identified to meet the preselected performance development goal.

2. A system as defined in claim 1, wherein the operation of predicting the future number of employees desired within the organization for the preselected period of time is further responsive to employee promotion criteria and current performance of employees.

3. A system as defined in claim 1,
wherein the operation of predicting the future number of employees desired within the organization for the preselected period of time is further responsive to birth or predicted retirement dates, expected promotion intervals, employee vacancy expectations, recruitment expectations, current performance of employees, employee promotion criteria, and grade potentials of employees, and
wherein the preselected manning assumptions comprise:
  retirement expectations,
  employee promotion expectations comprising one or more of the following:
expected promotion interval and unique employee promotion plan,
  employee vacancy expectations,
  recruitment expectations, and
  employee performance expectations.

4. A system as defined in claim 3, wherein the preselected recruitment assumptions comprise employee internal transfer expectations, employee promotion expectations, permanent employee expectations, temporary employee expectations, and independent contractor expectations.

5. A system as defined in claim 1,
wherein the preselected employment development assumptions comprise core competencies of the industry, personal aspirations of the individual employee, and business needs of the organization; and
wherein the employment development activities comprise assignments, tasks, courses, seminars, conferences, workshops, self-development activities, presentations, and participation in technical meetings.

6. A system as defined in claim 1,
wherein the operation of assigning includes:
  assigning self-development activities a higher point value than the point values assigned to the other of the employment development activities to thereby promote self-development, and
  assigning teaching of other employees activities an even higher value than that assigned to the self-development activities to thereby further promote employees teaching other employees.

7. A system as defined in claim 6, wherein the operations further comprise:
identifying each employee of the plurality of participating employees in the organization having a performance indicator total value exceeding a preselected threshold value for possibilities of rewarding or punishing the respective employee.

8. A system as defined in claim 1, wherein the operations further comprise:
identifying a specific user accessing a human resource database at a particular point in time, the human resource database containing the employment development plan for each participating employee;
providing a selected participating employee and mentor and supervisor for the selected participating employee within the organization with the right and ability to view and to modify the employment development plan for the selected participating employee; and
providing an associated manager within the organization the right and ability to view but not to modify the employment development plan for the selected participating employee.

9. A system as defined in claim 1,
wherein the employment development plan for each employee includes approximately five years of assigned employment development activities; and
wherein the human resource manning plan includes approximately ten years of predicted manning requirements.

10. A system as defined in claim 1, wherein the operations further comprise:
assigning the predicted future number of employees into a plurality of future employee groups; and
associating the future number of employees within the future employee groups to a future calendar year; and
wherein the future number of employees in the human resource manning plan comprises permanent employees, temporary employees, and independent contractors of the organization.

11. Non-transitory computer-readable medium storing program code to enhance multi-year human resource planning for an organization, the program code comprising instructions that when executed by a computer, cause the computer to perform the following operations:

responsive to preselected manning assumptions, predicting a future number of employees desired within the organization for a preselected period of time to thereby define an organization-level human resource manning plan for the organization;

responsive to information from the human resource manning plan and responsive to preselected recruitment assumptions, forming an organization-level recruitment plan;

responsive to preselected employment development assumptions and responsive to revisions to the recruitment plan, assigning a plurality of employment development activities to each of a plurality of participating employees in the organization to thereby define an employee-level employment development plan for each participating employee;

providing a plurality of feedback pathways so that revisions in one of the at least one of the employment development plans, the recruitment plan, and the human resource manning plan, are accounted for in each other of the at least one of the employment development plans, the recruitment plan, and the human resource manning plan, the plurality of feedback pathways comprising:
a first feedback pathway comprising:
revising the organization-level human resource manning plan responsive to revisions in the organization-level recruitment plan;
a second feedback pathway comprising:
revising the organization-level human resource manning plan responsive to revisions in at least one of the employee-level employment development plans;
a third feedback pathway comprising:
revising the organization-level recruitment plan responsive to revisions in the organization-level human resource manning plan, and
revising the organization-level human resource manning plan responsive to the revisions in the organization-level recruitment plan, and
a fourth feedback pathway comprising:
revising the organization-level recruitment plan responsive to revisions in the organization-level human resource manning plan,
revising at least one of the employment development plans for a corresponding at least one employee responsive to the revisions in the recruitment plan, and
revising the organization-level human resource manning plan responsive to the revisions in the at least one of the employee-level employment development plans; and creating a performance indicator for each participating employee in the organization, the performance indicator comprising:
a point value assigned to each separate one of a plurality of completed employment development activities identified to meet a preselected performance development goal,
a point value assigned to each separate one of one or more in-progress employment development activities identified to meet the preselected performance development goal, and
a total value indicating a combination of the point values assigned to each of the completed and in-progress employment development activities identified to meet the preselected performance development goal; and
assigning the respective point value or values for each separate one of the completed or in progress employment development activities identified to meet the preselected performance development goal.

12. Non-transitory computer readable medium as defined in claim 11,
wherein the operation of predicting the future number of employees desired within the organization for the preselected period of time is further responsive to employee promotion criteria and current performance of employees; and
wherein the preselected manning assumptions comprise retirement expectations, employee promotion expectations comprising one or more of the following: expected promotion interval and unique employee promotion plan, employee vacancy expectations, recruitment expectations, and employee performance expectations.

13. Non-transitory computer readable medium as defined in claim 12, wherein the preselected recruitment assumptions comprise employee internal transfer expectations, employee promotion expectations, permanent employee expectations, temporary employee expectations, and independent contractor expectations.

14. Non-transitory computer readable medium as defined in claim 11,
wherein the preselected employment development assumptions comprise core competencies of the industry, personal aspirations of the individual employee, and business needs of the organization; and
wherein the employment development activities comprise assignments, tasks, courses, seminars, conferences, workshops, self-development activities, presentations, and participation in technical meetings.

15. Non-transitory computer readable medium as defined in claim 11, wherein the operation of assigning includes:
assigning self-development activities a higher point value than the point values assigned to the other of the employment development activities to thereby promote self-development, and
assigning teaching of other employees activities an even higher value than that assigned to the self-development activities to thereby further promote employees teaching other employees.

16. Non-transitory computer readable medium as defined in claim 15, wherein the operations further comprise:
identifying each employee of the plurality of participating employees in the organization having a performance indicator total value exceeding a preselected threshold value for possibilities of rewarding or punishing the respective employee.

17. Non-transitory computer readable medium as defined in claim 11, wherein the operations further comprise:
identifying a specific user accessing a human resource database at a particular point in time, the human resource database containing the employment development plan for each participating employee;
providing a selected participating employee and mentor and supervisor for the selected participating employee within the organization with the right and ability to view and to modify the employment development plan for the selected participating employee; and
providing an associated manager within the organization the right and ability to view but not to modify the employment development plan for the selected participating employee.

18. Non-transitory computer readable medium as defined in claim 11,
wherein the employment development plan for each employee includes approximately five years of assigned employment development activities; and
wherein the human resource manning plan includes approximately ten years of predicted manning requirements.

19. Non-transitory computer readable medium as defined in claim 11, wherein the operations further comprise:
assigning the predicted future number of employees into a plurality of future employee groups; and
associating the future number of employees within the future employee groups to a future calendar year, the human resource manning plan including approximately ten years of predicted manning requirements; and
wherein the future number of employees in the human resource manning plan comprise permanent employees, temporary employees, and independent contractors of the organization.

20. Non-transitory computer readable medium as defined in claim 19, wherein the operations further comprise:
implementing in the human resource manning plan, real-time management decisions formulated responsive to at least of the one employment development plans and responsive to collective management discussions to determine the future number of employees in the human resource manning plan.

21. A computer-assisted method to enhance human resource planning for an organization, the method comprising the steps of:
predicting through utilization of a computer, a future number of employees desired within an organization for a preselected period of time responsive to human resource information and responsive to preselected manning assumptions to thereby define an organization-level human resource manning plan, the computer programmed to assist a user to enhance human resource planning for an organization;
forming through utilization of the computer, an organization-level recruitment plan responsive to information from the human resource manning plan and responsive to preselected recruitment assumptions;
assigning through utilization of the computer, a plurality of employment development activities to each of a plurality of participating employees in the organization responsive to preselected employment development assumptions and responsive to information from the recruitment plan to thereby define an employee-level employment development plan for each participating employee;
providing through utilization of the computer, a plurality of feedback pathways so that revisions in one of the following: at least one of the employment development plans, the recruitment plan, and the human resource manning plan are accounted for in each other of the at least one of the employment development plans, the recruitment plan, and the human resource manning plan, the plurality of feedback pathways comprising:
a first feedback pathway comprising:
revising the organization-level human resource manning plan responsive to revisions in the organization-level recruitment plan;
a second feedback pathway comprising:
revising the organization-level human resource manning plan responsive to revisions in at least one of the employee-level employment development plans;
a third feedback pathway comprising:
revising the organization-level recruitment plan responsive to revisions in the organization-level human resource manning plan, and
revising the organization-level human resource manning plan responsive to the revisions in the organization-level recruitment plan, and
a fourth feedback pathway comprising:
revising the organization-level recruitment plan responsive to revisions in the organization-level human resource manning plan,
revising at least one of the employment development plans for a corresponding at least one employee responsive to the revisions in the recruitment plan, and
revising the organization-level human resource manning plan responsive to the revisions in the at least one of the employee-level employment development plans; and
creating a performance indicator for each participating employee in the organization, the performance indicator comprising:
a point value assigned to each separate one of a plurality of completed employment development activities identified to meet a preselected performance development goal,
a point value assigned to each separate one of one or more in-progress employment development activities identified to meet the preselected performance development goal, and
a total value indicating a combination of the point values assigned to each of the completed and in-progress employment development activities identified to meet the preselected performance development goal; and
assigning the respective point value or values for each separate one of the completed or in progress employment development activities identified to meet the preselected performance development goal.

22. A method as defined in claim 21, wherein the preselected manning assumptions comprise retirement expectations, employee promotion expectations comprising one or more of the following: expected promotion interval and unique employee promotion plan, employee vacancy expectations, recruitment expectations, and employee performance expectations.

23. A method as defined in claim 22, wherein the preselected recruitment assumptions comprise employee internal transfer expectations, employee promotion expectations, permanent employee expectations, temporary employee expectations, and independent contractor expectations.

24. A method as defined in claim 21,
wherein the preselected employment development assumptions comprise core competencies of the industry, personal aspirations of the individual employee, and business needs of the organization; and
wherein the employment development activities comprise assignments, tasks, courses, seminars, conferences, workshops, self-development activities, presentations, and participation in technical meetings.

25. A method as defined in claim 21, wherein the operation of assigning includes:
assigning self-development activities a higher point value than the point values assigned to the other of the employment development activities to thereby promote self-development, and assigning teaching of other employees activities an even higher value than that assigned to the self-development activities to thereby further promote employees teaching other employees.

26. A method as defined in claim 25, further comprising the step of:
    identifying each employee of the plurality of participating employees in the organization having a performance indicator total value exceeding a preselected threshold value for possibilities of rewarding or punishing the respective employee.

27. A method as defined in claim 25, wherein the employment development activities comprise assignments, tasks, courses, seminars, conferences, workshops, self-development activities, presentations, and participation in technical meetings.

28. A method as defined in claim 25, wherein the employment development activities include assignments, tasks, courses, seminars, conferences, workshops, self-development activities, presentations, participation in technical meetings, writing technical papers, advanced educational degrees, special certificates of educational achievement, educational refund programs, internship assignments, recognitions, awards, inventions, and innovations by the employee.

29. A method as defined in claim 21, further comprising the steps of:
    identifying a specific user accessing a human resource database at a particular point in time, the human resource database containing the employment development plan for each participating employee;
    granting of a selected participating employee and mentor and supervisor for the selected participating employee within the organization with the right and ability to view and to modify the employment development plan for the selected participating employee; and
    providing an associated manager within the organization the right and ability to view but not to modify the employment development plan for the selected participating employee.

30. A method as defined in claim 21,
    wherein the employment development plan for each employee includes approximately five years of assigned employment development activities;
    wherein the human resource manning plan includes approximately ten years of predicted manning requirements; and
    wherein the steps further comprise displaying the human resource manning plan to a viewer through a graphical user interface.

31. A method as defined in claim 21, further comprising:
    assigning the predicted future number of employees into a plurality of future employee groups; and
    associating the future number of employees within the future employee groups to a future calendar year; and
    wherein the future number of employees in the human resource manning plan comprises permanent employees, temporary employees, and independent contractors of the organization.

32. A method as defined in claim 21, further comprising:
    implementing real-time management decisions to determine the employment development activities for at least one participating employee; and
    implementing real-time management decisions in the human resource manning plan formulated responsive to at least one of the employment development plans and responsive to collective management discussions to determine the future number of employees in the human resource manning plan.

\* \* \* \* \*